United States Patent
Hosaka et al.

(10) Patent No.: US 10,824,000 B2
(45) Date of Patent: Nov. 3, 2020

(54) LIQUID CRYSTAL DISPLAY DEVICE

(71) Applicants: Nissan Chemical Corporation, Chuo-ku (JP); Kyusyu Nanotec Optics Co. Ltd., Hayami-gun (JP)

(72) Inventors: Kazuyoshi Hosaka, Chuo-ku (JP); Noritoshi Miki, Chuo-ku (JP); Junichi Baba, Hayami-gun (JP); Shota Yoshida, Hayami-gun (JP)

(73) Assignees: Nissan Chemical Corporation, Chuo-ku (JP); Kyusu Nanotec Optics Co., Ltd., Hayami-gun (JP)

( * ) Notice: Subject to any disclaimer, the term of this patent is extended or adjusted under 35 U.S.C. 154(b) by 222 days.

(21) Appl. No.: 16/079,888

(22) PCT Filed: Feb. 24, 2017

(86) PCT No.: PCT/JP2017/007149
§ 371 (c)(1),
(2) Date: Aug. 24, 2018

(87) PCT Pub. No.: WO2017/146217
PCT Pub. Date: Aug. 31, 2017

(65) Prior Publication Data
US 2019/0049797 A1    Feb. 14, 2019

(30) Foreign Application Priority Data
Feb. 26, 2016  (JP) .................. 2016-036258

(51) Int. Cl.
| | | |
|---|---|---|
| *G02F 1/1337* | (2006.01) | |
| *G02F 1/1334* | (2006.01) | |
| *C09K 19/54* | (2006.01) | |
| *C08G 73/10* | (2006.01) | |
| *C08G 77/16* | (2006.01) | |
| *C08G 77/18* | (2006.01) | |
| *C09K 19/56* | (2006.01) | |
| *C09K 19/30* | (2006.01) | |
| *C09K 19/04* | (2006.01) | |

(52) U.S. Cl.
CPC ....... *G02F 1/1334* (2013.01); *C08G 73/1014* (2013.01); *C08G 77/16* (2013.01); *C08G 77/18* (2013.01); *C09K 19/54* (2013.01); *C09K 19/56* (2013.01); *G02F 1/1337* (2013.01); *G02F 1/133723* (2013.01); *C09K 2019/0448* (2013.01); *C09K 2019/3004* (2013.01); *C09K 2019/3009* (2013.01); *Y10T 428/1005* (2015.01)

(58) Field of Classification Search
CPC ......... G02F 1/1334; G02F 2001/13345; G02F 1/1337; G02F 1/133723; G02F 1/133711; C09K 19/56; C09K 19/54; C08G 73/1007; C08G 73/1004; Y10T 428/10; Y10T 428/1005; Y10T 428/1023

USPC .......... 428/1.1, 1.2, 1.26; 349/123, 127, 130
See application file for complete search history.

(56) References Cited

U.S. PATENT DOCUMENTS

2017/0199434 A1 *  7/2017  Hosaka .............. C09K 19/3852

FOREIGN PATENT DOCUMENTS

| | | |
|---|---|---|
| JP | 2885116 B2 | 4/1999 |
| JP | 4132424 B2 | 8/2008 |
| WO | WO-2015199148 A1 * 12/2015 ........... G02F 1/1333 |

* cited by examiner

*Primary Examiner* — Ruiyun Zhang
(74) *Attorney, Agent, or Firm* — Oblon, McClelland, Maier & Neustadt, L.L.P.

(57) ABSTRACT

A liquid crystal display device having a liquid crystal layer made of a cured product formed by irradiating a liquid crystal composition disposed between a pair of substrates provided with electrodes with ultraviolet light from an ultraviolet irradiation apparatus and at least one of the substrates being provided with a liquid crystal alignment film to vertically align liquid crystal, where the liquid crystal composition contains a curable resin, a bifunctional monomer, a compound of the following formula [1-1a], a compound of the following formula [2-1a] and a monomer having at least one polar group selected from a hydroxy group, a carboxy group and a phosphoric acid group, where the liquid crystal alignment film is obtainable from a liquid crystal alignment treating agent containing a polymer having a side chain structure of the following formula [4-1a] or formula [4-2a]

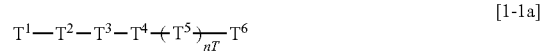

[1-1a]

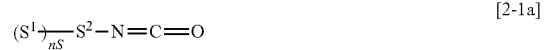

[2-1a]

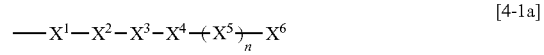

[4-1a]

$$—X^7—X^8 \quad \text{[4-2a]}$$

15 Claims, No Drawings

LIQUID CRYSTAL DISPLAY DEVICE

TECHNICAL FIELD

The present invention relates to a liquid crystal display device suitable as a reverse type device.

BACKGROUND ART

As a liquid crystal display device using a liquid crystal material, a TN (Twisted Nematic) mode has been put into practical use. This mode is one to perform switching of light by using the optical rotation properties of liquid crystal, and at the time of using it as a liquid crystal display device, it is necessary to use a polarizing plate. However, utilization efficiency of light is lowered by using a polarizing plate.

As a liquid crystal display device having high utilization efficiency of light without using a polarizing plate, there is a device to conduct switching between a transmission state (transparent state) and a scattering state of liquid crystal, and in general, one using polymer dispersed liquid crystal (PDLC: polymer dispersed liquid crystal) or polymer network liquid crystal (PNLC: polymer network liquid crystal) is known.

The liquid crystal display device using such liquid crystal is a liquid crystal display device wherein between a pair of substrates provided with electrodes, a liquid crystal composition containing a polymerizable compound that undergoes polymerization by ultraviolet light, is placed and curing of the liquid crystal composition is carried out by irradiation with ultraviolet light, to form a liquid crystal layer, i.e. a cured composite (e.g. a polymer network) of liquid crystal and the polymerizable compound. In this liquid crystal display device, the transmission state and the scattering state of the liquid crystal are controlled by application of a voltage.

The conventional liquid crystal display device using PDLC or PNLC is a liquid crystal display device (also referred to as a normal-type device) which becomes to be in an opaque (scattering) state when no voltage is applied, since liquid crystal molecules are randomly oriented, and becomes to be in a transmission state when a voltage is applied, since the liquid crystal is aligned in the direction of the electric field to transmit light. However, in the normal type device, in order to obtain a transmission state, it is necessary to apply a voltage constantly, and therefore, in an application where it is used in a transparent state in many cases, for example, when used in window glass, etc., power consumption tends to be large.

On the other hand, a liquid crystal display device (also referred to as a reverse-type device) using PDLC which becomes to be in a transmission state when no voltage is applied and becomes to be in a scattering state when a voltage is applied, has been reported (see Patent Documents 1 and 2).

PRIOR ART DOCUMENTS

Patent Documents

Patent Document 1: Japanese Patent No. 2885116
Patent Document 2: Japanese Patent No. 4132424

DISCLOSURE OF INVENTION

Technical Problem

The polymerizable compound in the liquid crystal composition has a role to form a polymer network to obtain the desired optical properties and a role as a curing agent to increase the adhesion between the liquid crystal layer and the liquid crystal alignment film. In order to increase the adhesion to the liquid crystal alignment film, it is necessary to make the polymer network to be further dense, but if the polymer network is made to be dense, there will be such a problem that vertical alignment of liquid crystal will be impaired, and the optical properties of the reverse-type device, i.e. the transparency when a voltage is not applied, and the scattering properties when a voltage is applied, will be deteriorated. Therefore, the liquid crystal composition to be used in the reverse-type device is required to be one whereby the vertical alignment of liquid crystal at the time of forming the liquid crystal layer becomes to be high.

Further, the liquid crystal alignment film used for the reverse-type device is a highly hydrophobic film in order to align liquid crystal vertically, and thus, there is a problem such that adhesion of the liquid crystal layer and the liquid crystal alignment film tends to be low. Therefore, to the liquid crystal composition to be used in the reverse-type device, a polymerizable compound having a role of a curing agent must be introduced in a larger amount. However, if the polymerizable compound is introduced in a large amount, the vertical alignment of liquid crystal tends to be inhibited, whereby there will be such a problem that the transparency when no voltage is applied and the scattering properties when a voltage is applied, will be substantially reduced.

Further, a reverse-type device may be used as bonded on a window glass for an automobile or architectural building, and thus, it is required that even in a harsh environment such as an high temperature and high humidity environment or an environment exposed to the irradiation of light, for a long period of time, the vertical alignment of liquid crystal will not be reduced, and the adhesion between the liquid crystal layer and the liquid crystal alignment film will be high.

The present invention has an object to provide a liquid crystal display device whereby the vertical alignment of liquid crystal is high, the optical properties are good, i.e. the transparency during no application of a voltage and the scattering properties at the time of application of a voltage are good, further adhesion between the liquid crystal layer and the liquid crystal alignment film is high, and even in an environment exposed to irradiation of light or high temperature and high humidity, for a long time, it is possible to maintain these characteristics.

Solution to Problem

The present inventors have accomplished the present invention having the following gist.

The present invention is a liquid crystal display device having a liquid crystal layer made of a cured product formed by irradiating a liquid crystal composition disposed between a pair of substrates provided with electrodes with ultraviolet light from an ultraviolet irradiation apparatus and at least one of the substrates being provided with a liquid crystal alignment film to vertically align liquid crystal, wherein the liquid crystal composition comprises a curable resin, a bifunctional monomer, a compound of the following formula [1-1a], a compound of the following formula [2-1a] and a monomer having at least one polar group selected from the group consisting of a hydroxy group, a carboxy group and a phosphoric acid group, and the liquid crystal alignment film is a liquid crystal alignment film obtainable from a liquid crystal alignment treating agent containing a polymer having a side chain structure of the following formula [4-1a] or formula [4-2a],

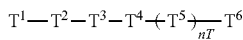 [1-1a]

wherein $T^1$ is a structure selected from the following formula [1-a] to formula [1-e], $T^2$ is a single bond or a $C_{1-24}$ alkylene group, provided that an optional —$CH_2$— in said alkylene group may be substituted by —O—, —CO—, —COO—, —OCO—, —CONH—, —NHCO—, —NH—, —CON($CH_3$)—, —S— or —$SO_2$—, $T^3$ is a cyclic group having a benzene ring, a cyclohexane ring or a heterocyclic ring, or a $C_{17-51}$ bivalent organic group having a steroid skeleton, provided that an optional hydrogen atom on said cyclic group may be substituted by a $C_{1-3}$ alkyl group, a $C_{1-3}$ alkoxy group, a $C_{1-3}$ fluorine-containing alkyl group, a $C_{1-3}$ fluorine-containing alkoxy group or a fluorine atom, $T^4$ is a single bond, —O—, —$OCH_2$—, —$CH_2O$—, —COO— or —OCO—, $T^5$ is a cyclic group having a benzene ring, a cyclohexane ring or a heterocyclic ring, provided that an optional hydrogen atom on such a cyclic group may be substituted by a $C_{1-3}$ alkyl group, a $C_{1-3}$ alkoxy group, a $C_{1-3}$ fluorine-containing alkyl group, a $C_{1-3}$ fluorine-containing alkoxy group or a fluorine atom, $T^6$ is a $C_{1-18}$ alkyl group, a $C_{2-18}$ alkenyl group, a $C_{1-18}$ fluorine-containing alkyl group, a $C_{1-18}$ alkoxy group or a $C_{1-18}$ fluorine-containing alkoxy group, and nT is an integer of from 0 to 4,

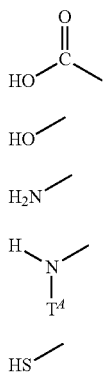

[1-a]
[1-b]
[1-c]
[1-d]
[1-e]

wherein $T^A$ is a $C_{1-5}$ alkyl group,

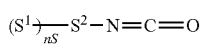 [2-1a]

wherein $S^1$ is at least one member selected from the group consisting of the following formula [2-a] to formula [2-e], $S^2$ is a $C_{2-18}$ linear or branched alkylene group, provided that an optional —$CH_2$— in said alkylene group not adjacent to $S^1$ and —N=C=O may be substituted by —O—, —CO—, —COO—, —OCO—, —CONH—, —NHCO— or —NH—, and nS is an integer of from 1 to 4),

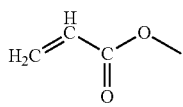 [2-a]

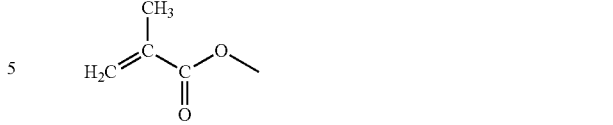

[2-b]
[2-c]
[2-d]
[2-e]

wherein $S^A$ and $S^C$ are each a single bond, —O—, —$CH_2O$—, —COO—, —OCO—, —CONH—, —NHCO— or —NH—, and $S^B$ is a hydrogen atom or a benzene ring,

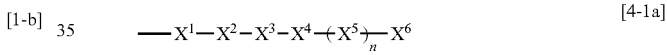 [4-1a]

wherein $X^1$ and $X^3$ are each a single bond, —$(CH_2)_a$— (a is an integer of from 1 to 15), —O—, —$CH_2O$—, —COO— or —OCO—, $X^2$ is a single bond or —$(CH_2)_b$— (b is an integer of from 1 to 15), $X^4$ is a cyclic group having a benzene ring, a cyclohexane ring or a heterocyclic ring, or a $C_{17-51}$ bivalent organic group having a steroid skeleton, provided that an optional hydrogen atom on said cyclic group may be substituted by a $C_{1-3}$ alkyl group, a $C_{1-3}$ alkoxy group, a $C_{1-3}$ fluorine-containing alkyl group, a $C_{1-3}$ fluorine-containing alkoxy group or a fluorine atom, $X^5$ is a cyclic group having a benzene ring, a cyclohexane ring or a heterocyclic ring, provided that an optional hydrogen atom on such a cyclic group, may be substituted by a $C_{1-3}$ alkyl group, a $C_{1-3}$ alkoxy group, a $C_{1-3}$ fluorine-containing alkyl group, a $C_{1-3}$ fluorine-containing alkoxy group or a fluorine atom, $X^6$ is a $C_{1-18}$ alkyl group, a $C_{2-18}$ alkenyl group, a $C_{1-18}$ fluorine-containing alkyl group, a $C_{1-18}$ fluorine-containing alkoxy group or a $C_{1-18}$ fluorine-containing alkoxy group, and n is an integer of from 0 to 4,

 [4-2a]

wherein $X^7$ is a single bond, —O—, —$CH_2O$—, —CONH—, —NHCO—, —CON($CH_3$)—, —N($CH_3$)CO—, —COO— or —OCO—, and $X^8$ is a $C_{8-18}$ alkyl group or a $C_{6-18}$ fluorine-containing alkyl group.

Advantageous Effects of Invention

According to the present invention, it is possible to provide a reverse-type device whereby the optical properties are good, i.e. the transparency during no application of a voltage and the scattering properties at the time of application of a voltage are good, further adhesion between the liquid crystal layer and the liquid crystal alignment film is high, and even in an environment exposed to irradiation of light or high temperature and high humidity, for a long time, it is possible to maintain these characteristics. Therefore, the liquid crystal display device of the present invention can be used, as a reverse type device, for a display for the purpose of presentation, for a light control window or optical shutter device for controlling the transmission and blocking of light, etc.

The reasons as to why the liquid crystal display device of the present invention has the above-mentioned excellent characteristics are considered to be substantially as follows.

A compound of the formula [1-1a] (also referred to as a specific compound (1)) contained in the liquid crystal composition to be used in a liquid crystal display device of the present invention has a portion of rigid structure such as a benzene ring or a cyclohexane ring, and thus, such a rigid structure will increase the vertical alignment of liquid crystal.

Further, a compound of the formula [2-1a] (also referred to as a specific compound (2)) contained in the liquid crystal composition of the present invention has a portion represented by $S^1$ in the formula [2-1a] which undergoes a polymerization reaction by ultraviolet light, and thus, will undergo a polymerization reaction with a polymerizable compound in the curable resin of the liquid crystal composition by irradiation with ultraviolet light.

Further, the specific compound (1) has a polar group represented by $T^1$ in the formula [1-1a], and this polar group will, together with at least one polar group selected from the group consisting of a hydroxy group, a carboxy group and a phosphoric acid group in the monomer contained in the liquid crystal composition, undergo an addition reaction with an isocyanate group (—N=C=O) in the specific compound (2).

Through the above polymerization reaction and addition reaction, it is possible to increase the vertical alignment of liquid crystal and to bring the polymer network of the liquid crystal layer in a dense state, whereby the optical properties of the device, especially improvement of transparency, adhesion between the liquid crystal layer and the liquid crystal alignment film, and durability in a harsh environment, can be obtained. Further, the monomer having at least one polar group selected from the group consisting of a hydroxy group, a carboxy group and a phosphoric acid group, can improve the adhesion between the liquid crystal layer and the liquid crystal alignment film, by the interaction between the polar group and the liquid crystal alignment film.

Further, the liquid crystal alignment film to be used in the liquid crystal display device of the present invention is obtained from a liquid crystal alignment treating agent containing a polymer (also referred to as a specific polymer) having a side chain structure of the formula [4-1a] or the formula [4-2a] (also referred to as a specific side chain structure). A device having a liquid crystal alignment film having such a specific side chain structure, presents a high and stable vertical alignment of liquid crystal, whereby it is possible to obtain a reverse-type device which exhibits good optical properties.

DESCRIPTION OF EMBODIMENTS

<Liquid Crystal Composition>

The liquid crystal composition of the present invention comprises a curable resin, a bifunctional monomer, a specific compound (1), a specific compound (2) and a monomer having at least one polar group selected from the group consisting of a hydroxy group, a carboxy group and a phosphoric acid group.

As liquid crystal, nematic liquid crystal, smectic liquid crystal or cholesteric liquid crystal may be used. Among them, preferred is one having a negative dielectric anisotropy. Further, from the viewpoint of low voltage driving and scattering properties, preferred is one having a larger anisotropy of dielectric constant and a larger anisotropy of refractive index. Specifically, the anisotropy of dielectric constant ($\Delta\epsilon$: also called dielectric constant anisotropy) is preferably from −1 to −10, more preferably from −3 to −6. Further, the anisotropy of refractive index ($\Delta n$: also called refractive index anisotropy) is preferably from 0.150 to 0.350, more preferably from 0.150 to 0.250. Further, the phase transition temperature of liquid crystal is preferably from 40 to 120° C., more preferably from 80 to 100° C. As liquid crystal, two or more types may be used depending on the respective physical property values of the phase transition temperature, the dielectric constant anisotropy and the refractive index anisotropy.

Further, in order to drive a liquid crystal display device as an active device such as TFT (Thin Film Transistor), it is required that the electrical resistance of liquid crystal is high and the voltage holding ratio (also referred to as VHR) is high. Therefore, as the liquid crystal, preferred is a fluorine-based or chlorine-based liquid crystal which has a high electrical resistance and whereby VHR does not decrease by an active energy ray such as ultraviolet light.

Further, a liquid crystal display device may also be made to be a guest-host type device by dissolving a dichroic dye in the liquid crystal composition. In such a case, it is possible to obtain a device which becomes to be transparent when no voltage is applied and which becomes to have light absorbed (scattering) when a voltage is applied. Moreover, in this device, the direction of the liquid crystal director (direction of alignment) will vary 90 degrees depending upon the presence or absence of the voltage application, and therefore, by utilizing the difference in light absorption characteristic of the dichroic dye, a high contrast is obtainable as compared to a conventional guest-host type device to conduct switching between random alignment and vertical alignment. Further, the guest-host type device having a dichroic dye dissolved, becomes colored when liquid crystal is aligned in a horizontal direction, and becomes opaque only in a scattering state. Therefore, it is also possible to obtain a device which can be switched, as a voltage is applied, from colorless transparent at the time of no application of a voltage to a colored opaque or colored transparent state.

The curable resin in the present invention contains a polymerizable compound in order to form a polymer network of the liquid crystal layer. The polymer network may be formed by introducing a polymerizable compound in the liquid crystal composition, followed by irradiation with ultraviolet light during preparation of a device, to conduct the polymerization reaction to form a polymer network, or a polymer preliminarily obtained by subjecting the polymerizable compound to a polymerization reaction may be introduced into the liquid crystal composition. However, even in the case of the polymer, it is required to have a portion which will undergo a polymerization reaction by irradiation with ultraviolet light. From the viewpoint of handling efficiency of the liquid crystal composition, i.e.

inhibition of high viscosity of the liquid crystal composition or the solubility in liquid crystal, it is preferred to introduce a polymerizable compound in the liquid crystal composition, followed by irradiation with ultraviolet light during preparation of a device, to let the polymerization reaction take place to form a polymer network.

The polymerizable compound in the liquid crystal composition is not particularly limited so long as it is soluble in liquid crystal and may be a polymer including its oligomer, and it is preferred that when the polymerizable compound is dissolved in liquid crystal, a temperature is present at which a part or whole of the liquid crystal composition shows a liquid crystal phase. Even in a case where a part of the liquid crystal composition exhibits a liquid crystal phase, when checking the liquid crystal display device with naked eyes, it is preferred that the substantially uniform transparency and scattering properties are obtained in the entire device.

The polymerizable compound may be a compound that is polymerizable by ultraviolet light, whereby the polymerization may be proceeded in any reaction mode to form a polymer network. As a specific reaction mode, radical polymerization, cationic polymerization, anionic polymerization or polyaddition reaction may be mentioned.

Among them, the reaction mode of the polymerizable compound is preferably radical polymerization from the viewpoint of the optical properties of the liquid crystal display device. At that time, as the polymerizable compound, it is possible to use the following radical type polymerizable compound or its oligomer. Further, as mentioned above, it is also possible to use a polymer obtained by polymerizing such a polymerizable compound.

Specific examples of such a radical type polymerizable compound or its oligomer may be monofunctional polymerizable compounds, bifunctional polymerizable compounds and polyfunctional polymerizable compounds as described from page 7 to page 9 of WO2015/199148. Among them, in the present invention, it is preferred to use bifunctional polymerizable compounds as described in the same publication.

Further, it is also possible to use a polyurethane acrylate such as phenyl glycidyl ether acrylate hexamethylene diisocyanate urethane prepolymer, pentaerythritol triacrylate hexamethylene diisocyanate urethane prepolymer or dipentaerythritol pentaacrylate hexamethylene diisocyanate urethane prepolymer, or a monomer or oligomer thereof. These radical type of polymerizable compounds may be used alone or in combination depending on the respective properties.

In the liquid crystal composition, the content proportion of the polymer including the polymerizable compound or its oligomer to form the curable resin is preferably from 70 to 150 parts by mass, more preferably from 80 to 120 parts by mass, to 100 parts by mass of liquid crystal in the liquid crystal composition from the viewpoint of adhesion between the liquid crystal layer and the liquid crystal alignment film in the liquid crystal display device.

To facilitate formation of the polymer network, it is preferred to introduce a radical initiator (also referred to as a polymerization initiator) that generates radicals by ultraviolet light, into the liquid crystal composition, for the purpose of promoting the radical polymerization of the polymerizable compound.

Specifically, radical initiators described from page 10 to page 11 of WO2015/199148 may be mentioned.

The proportion of the radical initiator to be used, is, from the viewpoint of adhesion between the liquid crystal layer and the liquid crystal alignment film in the device, preferably from 0.01 to 10 parts by mass, more preferably from 0.05 to 5 parts by mass, to 100 parts by mass of liquid crystal in the liquid crystal composition. One of these radical initiators may be used alone, or two or more of them may be used in combination, depending on the respective properties.

The specific compound (1) in the present invention is represented by the above-mentioned formula [1-1a], and in the formula, $T^1$, $T^2$, $T^3$, $T^4$, $T^5$, $T^6$ and nT are as defined above, but, particularly, they are, respectively, preferably the following ones.

$T^1$ is preferably the formula [1-b], the formula [1-c] or the formula [1-e] from the viewpoint of the addition reaction with the specific compound (2). More preferably, it is the formula [1-b] or the formula [1-c]. $T^2$ is preferably a single bond or a $C_{1-12}$ alkylene group provided that an optional —$CH_2$— in the alkylene group may be substituted by —O—, —CO—, —COO—, —OCO—, —CONH—, —NHCO—, —NH—, —CON(CH$_3$)—, —S— or —SO$_2$—. More preferably, it is a single bond or a $C_{1-8}$ alkylene group. $T^3$ is, from the viewpoint of the optical properties of the liquid crystal display device, preferably a benzene ring, a cyclohexane ring, or a $C_{17-51}$ bivalent organic group having a steroid skeleton. More preferably, it is a benzene ring or a cyclohexane ring. $T^4$ is preferably a single bond, —O—, —COO— or —OCO—, more preferably a single bond. $T^5$ is, from the viewpoint of the optical properties of the liquid crystal display device, preferably a benzene ring or a cyclohexane ring. $T^6$ is, from the viewpoint of the optical properties of the liquid crystal display device, preferably a $C_{1-18}$ alkyl group, a $C_{2-18}$ alkenyl group or a $C_{1-18}$ alkoxy group. More preferably, it is a $C_{1-12}$ alkyl group or alkoxy group. nT is an integer of from 0 to 3, more preferably 1 or 2.

As the specific compound (1), a compound of the following formula [1-2a] is preferred.

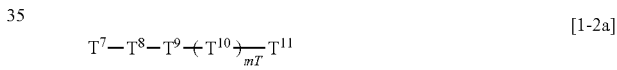

[1-2a]

In the formula [1-2a], $T^7$ is the above formula [1-b] or formula [1-c]. $T^8$ is a single bond or a $C_{1-8}$ alkylene group. $T^9$ and $T^{10}$ are each a benzene ring or a cyclohexane ring. $T^{11}$ is a $C_{1-12}$ alkyl group or alkoxy group. mT is an integer of from 0 to 2. Specifically, compounds of the following formula [1a-1] to formula [1a-24] may be mentioned.

In the formula [1-2a], $T^7$, $T^8$, $T^9$, $T^{10}$, $T^{11}$ and mT are as defined above, and more specifically, compounds of the following formula [1a-1] to formula [1a-24] may be mentioned.

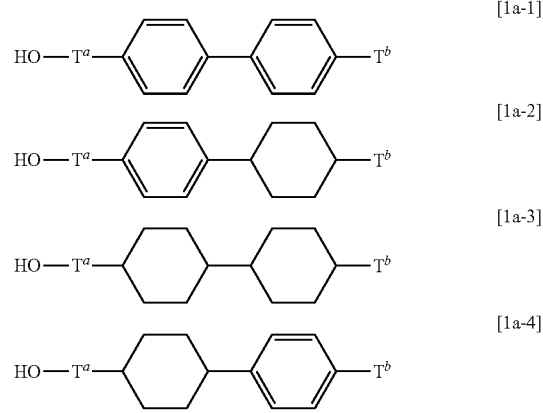

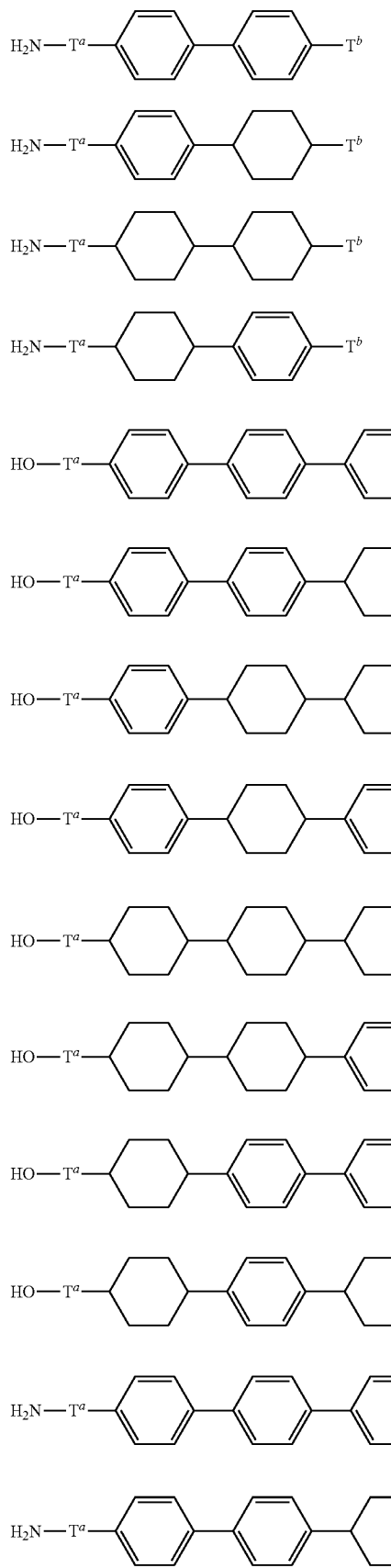
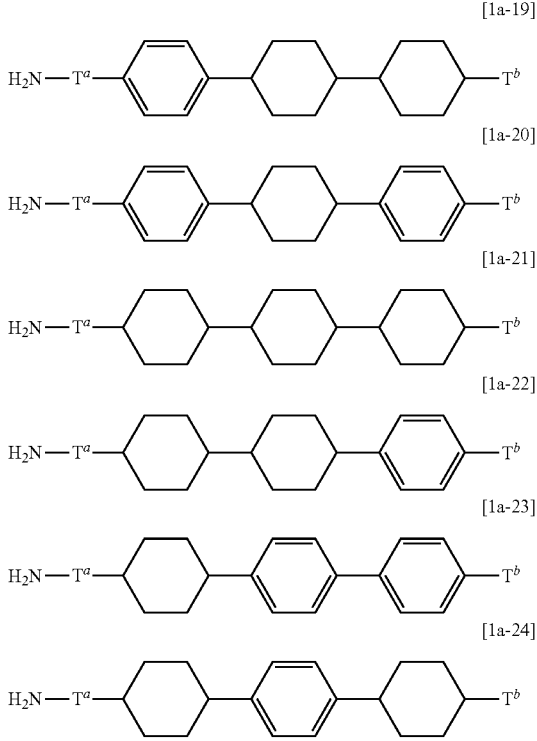

In the formula [1a-1] to formula [1a-24], $T^a$ is a single bond or a $C_{1-8}$ alkylene group. $T^b$ is a $C_{1-12}$ alkyl group or alkoxy group.

Among them, from the viewpoint of the optical properties of the liquid crystal display device, preferred is the formula [1a-1] to formula [1a-3], the formula [1a-5] to formula [1a-7], the formula [1a-10], the formula [1a-11], the formula [1a-13], the formula [1a-18], the formula [1a-19] or the formula [1a-21]. More preferred is the formula [1a-1] to formula [1a-4], the formula [1a-10], the formula [1a-11] or the formula [1a-13]. Most preferred, from the viewpoint of the optical properties of the liquid crystal display device, is the formula [1a-2], the formula [1a-3], the formula [1a-11] or the formula [1a-13].

The proportion of the specific compound (1) is preferably from 1 to 40 parts by mass, more preferably from 1 to 30 parts by mass, most preferably from 1 to 20 parts by mass, to 100 parts by mass of liquid crystal in the liquid crystal composition, from the viewpoint of the optical properties of the liquid crystal display device. One of these specific compounds (1) may be used alone, or two or more of them may be used in combination, depending on the respective properties.

The specific compound (2) is a compound of the above formula [2-1a], and in the formula [2-1a], $S^1$, $S^2$ and nS are as defined above.

Among them, $S^1$ is, from the viewpoint of adhesion between the liquid crystal layer and the liquid crystal alignment film in the liquid crystal display device, preferably the above formula [2-a], formula [2-b], formula [2-c] or formula [2-e], more preferably the formula [2-a] or the formula [2-b]. $S^2$ is preferably a $C_{2-12}$ linear or branched alkylene group, provided that an optional —$CH_2$— in the alkylene group not adjacent to $S^1$ and —N=C=O may be substituted by —O—, —CO—, —COO—, —OCO—, —CONH—, —NHCO— or —NH—. More preferably, it is a $C_{2-8}$ linear or branched alkylene group. nS is, from the viewpoint of adhesion between the liquid crystal layer and the liquid crystal alignment film in the liquid crystal display device, preferably an integer of from 2 to 4, more preferably 2.

As the specific compound (2), a compound of the following formula [2-2a] is preferred.

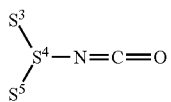

[2-2a]

In the formula [2-2a], $S^3$ and $S^5$ are each the above formula [2-a] or formula [2-b]. $S^4$ is a $C_{2-8}$ linear or branched alkylene group. Specifically, compounds of the following formula [2a-1] to formula [2a-4] may be mentioned.

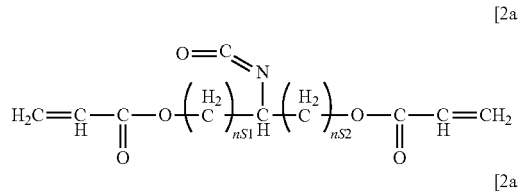

[2a-1]

[2a-2]

nS1 and nS2 are each an integer of from 0 to 7, provided that nS1+nS2 is an integer of from 1 to 7.

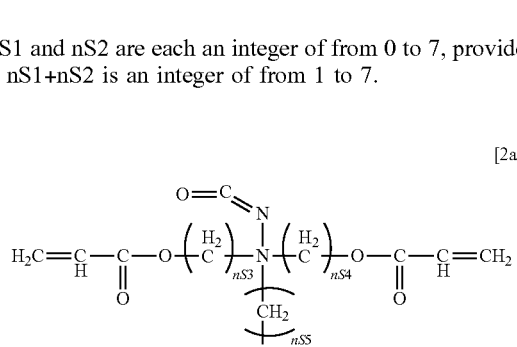

[2a-3]

[2a-4]

nS3 to nS5 are each an integer of from 0 to 6, provided that nS3+nS4+nS5 is an integer of from 1 to 6.

In the present invention, from the viewpoint of adhesion between the liquid crystal layer and the liquid crystal alignment film, compounds of the above formula [2a-1] to formula [2a-4] are preferred.

The proportion of the specific compound (2) is, from the viewpoint of the optical properties of the liquid crystal display device, preferably from 1 to 40 parts by mass, more preferably from 1 to 30 parts by mass, to 100 parts by mass of liquid crystal in the liquid crystal composition. One of the specific compounds (2) may be used alone, or two or more of them may be used in combination, depending on the respective properties.

The liquid crystal composition of the present invention preferably contains a compound of the following formula [3-1a] (also referred to as a specific compound (3)) in order to improve the optical properties, particularly the transparency, of the liquid crystal display device.

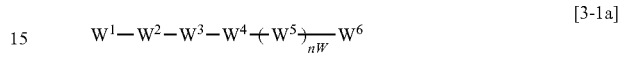

[3-1a]

In the formula [3-1a], $W^1$ is a structure selected from the following formula [3-a] to formula [3-e]. $W^2$ is a single bond or a $C_{1-24}$ alkylene group, provided that an optional —$CH_2$— in the alkylene group may be substituted by —O—, —CO—, —COO—, —OCO—, —CONH—, —NHCO—, —NH—, —CON(CH$_3$)—, —S— or —SO$_2$—. $W^3$ is a cyclic group having a benzene ring, a cyclohexane ring or a heterocyclic ring, or a $C_{17-51}$ bivalent organic group having a steroid skeleton, provided that an optional hydrogen atom on said cyclic group may be substituted by a $C_{1-3}$ alkyl group, alkoxy group, fluorine-containing alkyl group or fluorine-containing alkoxy group, or a fluorine atom. $W^4$ is a single bond, —$CH_2$—, —O—, —$OCH_2$—, —$CH_2O$—, —COO— or —OCO—. $W^5$ is a cyclic group having a benzene ring, a cyclohexane ring or a heterocyclic ring, provided that an optional hydrogen atom on such a cyclic group may be substituted by a $C_{1-3}$ alkyl group, alkoxy group, fluorine-containing alkyl group or fluorine-containing alkoxy group, or a fluorine atom. $W^6$ is a $C_{1-18}$ alkyl group, fluorine-containing alkyl group, alkoxy group or fluorine-containing alkoxy group, or a $C_{2-18}$ alkenyl group. nW is an integer of from 0 to 4.

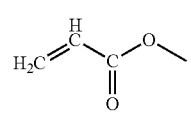

[3-a]

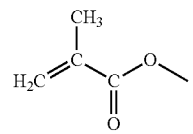

[3-b]

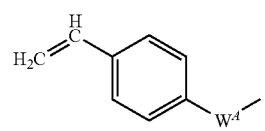

[3-c]

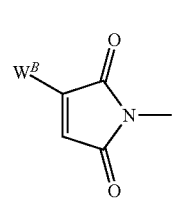

[3-d]

[3-e]

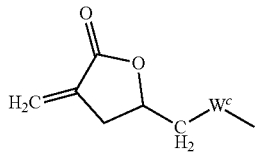

$W^A$ and $W^C$ are each a single bond, —O—, —CH$_2$O—, —COO—, —OCO—, —CONH—, —NHCO— or —NH—. $W^B$ is a hydrogen atom or a benzene ring.

In the formula [3-1a], $W^1$, $W^2$, $W^3$, $W^4$, $W^5$, $W^6$ and nW are, respectively preferably as follows.

$W^1$ is preferably the above formula [3-a], the above formula [3-b], the above formula [3-c] or the above formula [3-e]. More preferably, from the viewpoint of adhesion between the liquid crystal layer and the liquid crystal alignment film, it is a structure of the formula [3-a], the formula [3-b] or the formula [3-c].

$W^2$ is preferably a single bond or a $C_{1-12}$ alkylene group, provided that an optional —CH$_2$— in said alkylene group may be substituted by —O—, —CO—, —COO—, —OCO—, —CONH—, —NHCO—, —NH—, —CON(CH$_3$)—, —S— or —SO$_2$—. More preferably, it is a single bond or a $C_{1-8}$ alkylene group.

$W^3$ is, from the viewpoint of the optical properties of the liquid crystal display device, preferably a benzene ring, a cyclohexane ring or a $C_{17-51}$ bivalent organic group having a steroid skeleton, more preferably, a benzene ring or a cyclohexane ring.

$W^4$ is preferably a single bond, —CH$_2$—, —O—, —COO— or —OCO—. $W^5$ is, from the viewpoint of the optical properties of the liquid crystal display device, preferably a benzene ring or a cyclohexane ring. $W^6$ is, from the viewpoint of the optical properties of the device, preferably a $C_{1-18}$ alkyl group, a $C_{2-18}$ alkenyl group or a $C_{1-18}$ alkoxy group. More preferably, it is a $C_{1-12}$ alkyl group or a $C_{1-12}$ alkoxy group. nW is preferably an integer of from 0 to 3. More preferably, it is an integer of from 0 to 2.

As the specific compound (3), more specifically, compounds of the following formula [3a-1] to formula [3a-6] may be mentioned, and from the viewpoint of optical properties, these compounds are preferred.

[3a-1]

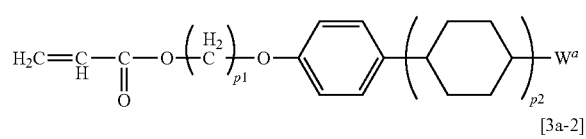

[3a-2]

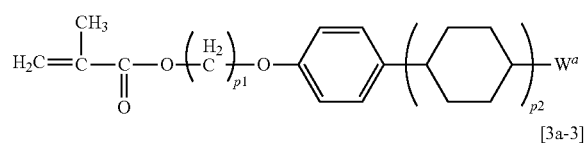

[3a-3]

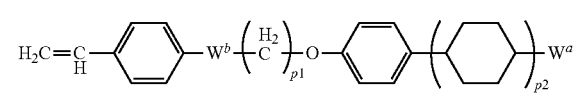

$W^a$ is a $C_{1-18}$ alkyl group or a $C_{1-18}$ alkoxy group. Among them, a $C_{1-12}$ alkyl group is preferred. $W^b$ is —O—, —COO— or —OCO—. In particular, —O— is preferred. p1 is an integer of from 1 to 12. Among them, from the viewpoint of the optical properties of the liquid crystal display device, an integer of from 1 to 8 is preferred. p2 is an integer of from 1 to 3. Among them, an integer of 1 or 2 is preferred.

[3a-4]

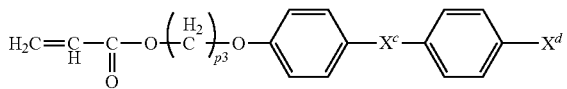

[3a-5]

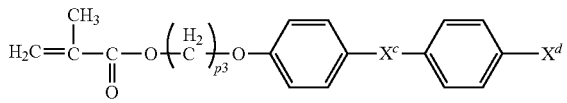

[3a-6]

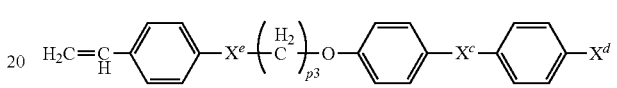

$X^c$ is —CH$_2$—, —O—, —COO— or —OCO—. Among them, —O—, —COO— or —OCO— is preferred. $X^d$ is a $C_{1-18}$ alkyl group or a $C_{1-18}$ alkoxy group. Among them, a $C_{1-12}$ alkyl group is preferred. $X^e$ is —O—, —COO— or an —OCO—. Among them, —O— is preferred. p3 is an integer of from 1 to 12. Among them, from the viewpoint of the optical properties of the liquid crystal display device, an integer of from 1 to 8 is preferred. Most preferred from the viewpoint of the optical properties of the liquid crystal display device, is a compound of the formula [3a-1] or formula [3a-2].

The proportion of the specific compound (3) is, from the viewpoint of the optical properties of the liquid crystal display device, preferably from 1 to 40 parts by mass, more preferably from 1 to 30 parts by mass, most preferably from 1 to 20 parts by mass, to 100 parts by mass of liquid crystal in the liquid crystal composition.

Further, as the specific compound (3), one type may be used alone, or two or more types may be used in combination, depending on the respective properties.

As the monomer having at least one polar group selected from the group consisting of a hydroxy group, a carboxy group and a phosphoric acid group, to be used in the present invention, particularly preferred is an organic phosphoric acid compound being a monomer having a phosphoric acid group. As the organic phosphoric acid compound, preferred may be triphenyl phosphate, tris nonylphenyl phosphate, tricresyl phosphate, tetraphenyl dipropylene glycol phosphate, etc.

The content proportion of the above monomer having a polar group in the liquid crystal composition is, from the viewpoint of adhesion between the liquid crystal layer and the liquid crystal alignment film in the liquid crystal display device, preferably from 0.1 to 20 parts by mass, more preferably from 0.5 to 10 parts by mass, to 100 parts by mass of liquid crystal in the liquid crystal composition.

In the present invention, the curable resin preferably contains at least one polymerizable compound selected from the group consisting of an aliphatic urethane acrylate, an aliphatic urethane methacrylate, an isobornyl acrylate, an isobornyl methacrylate, an acrylate ester, a methacrylate ester, a hydroxyethyl acrylate, a hydroxyethyl methacrylate, a 2-hydroxypropyl acrylate and a 2-hydroxypropyl methacrylate. At that time, oligomers thereof may be used. More preferred is an aliphatic urethane acrylate, an isobornyl acrylate, an acrylate ester or a hydroxyethyl methacrylate.

As the bifunctional monomer in the present invention, the above-mentioned bifunctional polymerizable compounds may be mentioned. Among them, it is preferred to use 1,9-nonanediol diacrylate, 1,9-nonanediol dimethacrylate, polyethylene glycol diacrylate, polyethylene glycol dimethacrylate, polypropylene glycol diacrylate or polypropylene glycol dimethacrylate. More preferred is 1,9-nonanediol diacrylate or 1,9-nonanediol methacrylate.

Further, the content proportion of the bifunctional monomer in the liquid crystal composition is, from the viewpoint of the optical properties of the liquid crystal display device, preferably from 1 to 50 parts by mass, more preferably from 5 to 30 parts by mass, to 100 parts by mass of liquid crystal in the liquid crystal composition.

Into the liquid crystal composition of the present invention, from the viewpoint of the optical properties of the liquid crystal display device and adhesion between the liquid crystal layer and the liquid crystal alignment film, it is preferred to incorporate a polyfunctional thiol compound or an oligomer thereof. Specifically, a polyfunctional thiol compound such as pentaerythritol tetrakis (3-mercaptobutyrate), 1,4-bis(3-mercaptobutyryloxy) butane, 1,3,5-tris(3-mercaptobutyryloxy-ethyl)-1,3,5-triazine-2,4,6 (IH,3H,5H)-trione, trimethylolpropane tris(3-mercaptobutyrate) or trimethylolethane tris (3-mercaptobutyrate), or an oligomer thereof, may be mentioned.

<Liquid Crystal Alignment Treating Agent>

The liquid crystal alignment film is obtainable from a liquid crystal alignment treating agent containing a polymer having a specific side chain structure of the above formula [4-1a] or formula [4-2a].

In the formula [4-1a], $X^1$, $X^2$, $X^3$, $X^4$, $X^5$, $X^6$ and n are as defined above, and among them, the following ones are, respectively, preferred.

$X^1$ is, from the viewpoint of availability or easy synthesis of raw material, preferably a single bond, —$(CH_2)_a$— (a is an integer of from 1 to 15), —O—, —$CH_2O$— or —COO—, more preferably, a single bond, —$(CH_2)_a$— (a is an integer of from 1 to 10), —O—, —$CH_2O$— or —COO—. $X^2$ is preferably a single bond or —$(CH_2)_b$— (b is an integer of from 1 to 10). $X^3$ is, from the viewpoint of easy synthesis, preferably a single bond, —$(CH_2)_a$— (a is an integer of from 1 to 15), —O—, —$CH_2O$— or —COO—, more preferably, a single bond, —$(CH_2)_a$— (a is an integer of from 1 to 10), —O—, —$CH_2O$— or —COO—.

$X^4$ is, from the viewpoint of easy synthesis, preferably a benzene ring, a cyclohexane ring or a $C_{17-51}$ organic group having a steroid skeleton. $X^5$ is preferably a benzene ring or a cyclohexane ring. $X^6$ is preferably a $C_{1-18}$ alkyl group, a $C_{1-10}$ fluorine-containing alkyl group, a $C_{1-18}$ alkoxy group or a $C_{1-10}$ fluorine-containing alkoxy group. More preferably, it is a $C_{1-12}$ alkyl group or a $C_{1-12}$ alkoxy group. Particularly preferably, it is a $C_{1-9}$ alkyl group or a $C_{1-9}$ alkoxy group. n is, from the viewpoint of availability or easy synthesis of raw material, preferably an integer of from 0 to 3, more preferably from 0 to 2.

Preferred combinations of $X^1$ to $X^6$ and n may be the same combinations as (2-1) to (2-629) listed in Tables 6 to 47 from page 13 to page 34 in international publication WO2011/132751. In each Table in the international publication, $X^1$ to $X^6$ in the present invention are shown as Y1 to Y6, and therefore, Y1 to Y6 shall be read as $X^1$ to $X^6$. Further, in (2-605) to (2-629) listed on the respective pages in the international publication, a $C_{17-51}$ organic group having a steroid skeleton in the present invention is shown as a $C_{12-25}$ organic group having a steroid skeleton, and therefore, the $C_{12-25}$ organic group having a steroid skeleton shall be read as a $C_{17-51}$ organic group having a steroid skeleton.

Among them, preferred is a combination of (2-25) to (2-96), (2-145) to (2-168), (2-217) to (2-240), (2-268) to (2-315), (2-364) to (2-387), (2-436) to (2-483), or (2-603) to (2-615). A particularly preferred combination is (2-49) to (2-96), (2-145) to (2-168), (2-217) to (2-240), (2-603) to (2-606), (2-607) to (2-609), (2-611), (2-612), or (2-624).

In the formula [4-2a], $X^7$ and $X^8$ are as defined above, and among them, the following ones are, respectively, preferred. $X^7$ is preferably a single bond, —O—, —$CH_2O$—, —CONH—, —CON($CH_3$)— or —COO—, more preferably a single bond, —O—, —CONH— or —COO—. $X^8$ is preferably a $C_{8-18}$ alkyl group.

As the specific side chain structure in the present invention, it is preferred to use a specific side chain structure of the formula [4-1a] in that as described above, it is thereby possible to obtain high and stable vertical alignment of liquid crystal.

The specific polymer having a specific side chain structure is, although not particularly limited, preferably at least one member selected from the group consisting of an acrylic polymer, a methacrylic polymer, a novolak resin, a polyhydroxystyrene, a polyimide precursor, a polyimide, a polyamide, a polyester, cellulose and a polysiloxane. More preferably, it is a polyimide precursor, a polyimide or a polysiloxane.

In a case where as the specific polymer, a polyimide precursor or a polyimide (collectively referred to as a polyimide-type polymer) is used, it may be a polyimide precursor or a polyimide obtainable by reacting a diamine component and a tetracarboxylic acid component.

The polyimide precursor has a structure of the following formula [A].

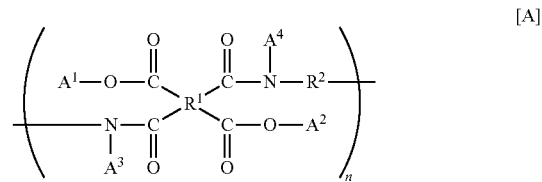

$R^1$ is a tetravalent organic group. $R^2$ is a bivalent organic group. $A^1$ and $A^2$ are each a hydrogen atom or a $C_{1-8}$ alkyl group. $A^3$ and $A^4$ are each a hydrogen atom, a $C_{1-5}$ alkyl group or an acetyl group. n is a positive integer.

The above diamine component may be a diamine having two primary or secondary amino groups in the molecule, and the tetracarboxylic acid component may be a tetracarboxylic acid compound, a tetracarboxylic dianhydride, a tetracarboxylic acid dihalide compound, a tetracarboxylic acid dialkyl ester compound or a tetracarboxylic acid dialkyl ester dihalide compound.

The polyimide-type polymer is preferably a polyamic acid with a structural formula of repeating units of the following formula [D] or a polyimide obtained by imidizing such a polyamic acid, from such a reason that it is relatively easily obtainable by using tetracarboxylic dianhydride of the following formula [B] and a diamine of the following formula [C] as raw materials.

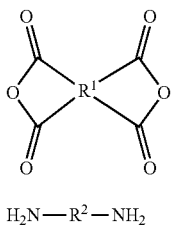
[B]

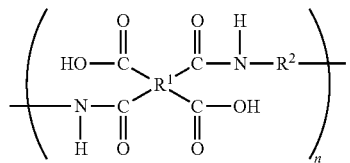
[C]

R[1] and R[2] are the same as defined in the formula [A].

[D]

R[1] and R[2] are the same as defined in the formula [A].

Further, by conventional synthetic procedures, it is possible to introduce to the polymer of the formula [D] obtained as described above, a $C_{1-8}$ alkyl group as A[1] and A[2] in the formula A and a $C_{1-5}$ alkyl group or an acetyl group as A[3] and A[4] in the formula [A].

As a method of introducing the specific side chain structure to the polyimide-type polymer, it is preferred to use a diamine having the specific side chain structure as a part of the raw material.

In particular, it is preferred to use a diamine of the above formula [4a] (also referred to as a specific side chain type diamine).

In the formula [4a], X is the above formula [4-1a] or formula [4-2a]. Further, in the formula [4-1a], details and preferred combinations of X[1], X[2], X[3], X[4], X[5], X[6] and n are as in the above formula [4-1a], and details and preferred combinations of X[7] and X[8] in the formula [4-2a] are as in the above formula [4-2a]. m is an integer of from 1 to 4. Among them, an integer of 1 is preferred.

Specific examples of the specific side-chain type diamine having a specific side chain structure of the formula [4-1a] may be diamine compounds of the formula [2-1] to the formula [2-6], the formula [2-9] to the formula [2-36] as described from page 15 to page 19 of international publication WO2013/125595. Here, in the international publication, $R_2$ in the formula [2-1] to the formula [2-3] and $R_4$ in the formula [2-4] to the formula [2-6] are each at least one member selected from the group consisting of a $C_{1-18}$ alkyl group, a $C_{1-18}$ fluorine-containing alkyl group, a $C_{1-18}$ alkoxy group and a $C_{1-18}$ fluorine-containing alkoxy group. Further, $A_4$ in the formula [2-13] is a $C_{3-18}$ linear or branched alkyl group. In addition, $R_3$ in the formula [2-4] to the formula [2-6] is at least one member selected from the group consisting of —O—, —CH$_2$O—, —COO— and —OCO—.

Among them, a preferred diamine is the formula [2-1] to the formula [2-6], the formula [2-9] to the formula [2-13] or the formula [2-22] to the formula [2-31] as described in international publication WO2013/125595. More preferred, from the viewpoint of the optical properties of the liquid crystal display device, is a diamine of the formula [4a-32] to the formula [4a-41].

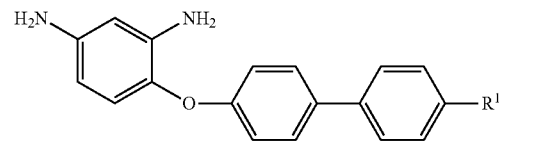
[4a-32]

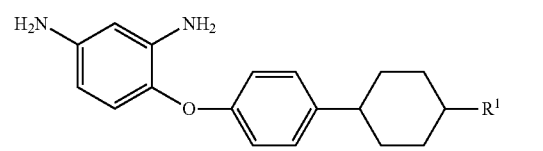
[4a-33]

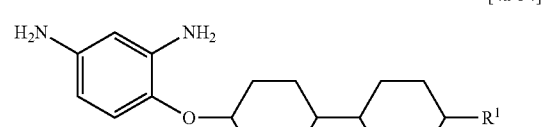
[4a-34]

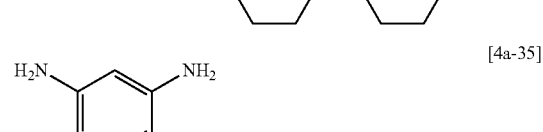
[4a-35]

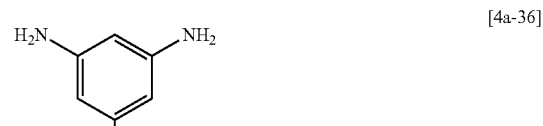
[4a-36]

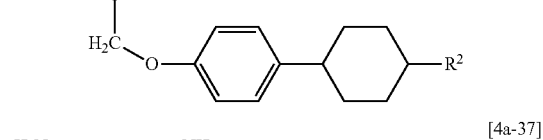
[4a-37]

R[1] and R[2] are each a $C_{3-12}$ alkyl group.

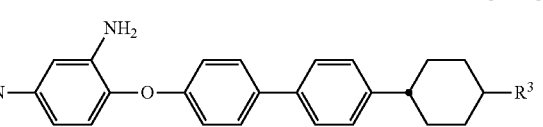
[4a-38]

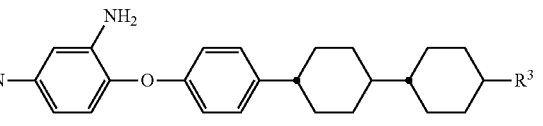
[4a-39]

[4a-40]

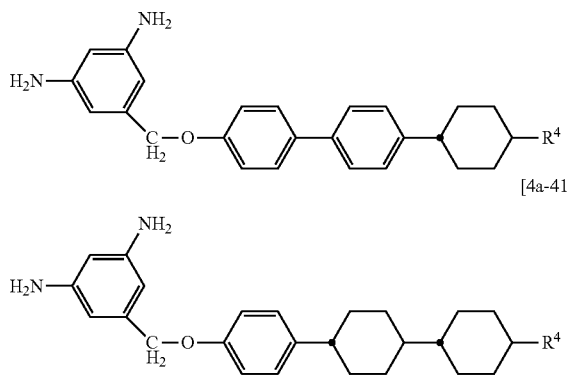

[4a-41]

$R^3$ and $R^4$ are each a $C_{3-12}$ alkyl group, and the cis-trans isomerism of 1,4-cyclohexylene is a trans isomer.

Most preferred is, from the viewpoint of the optical properties of the liquid crystal display device, a diamine of the above formula [4a-35] to formula [4a-37], the formula [4a-40] or the formula [4a-41].

Specific examples of the specific side-chain type diamine having a specific side chain structure of the above formula [4-2a] may be diamine compounds of the formula [DA1] to the formula [DA11] as described at page 23 in international publication WO2013/125595. Here, in the international publication, $A_1$ in the formula [DA1] to the formula [DA5] is a $C_{8-22}$ alkyl group or a $C_{6-18}$ fluorine-containing alkyl group.

The proportion of the specific side-chain type diamine is, from the viewpoint of the optical properties of the liquid crystal display device and adhesion between the liquid crystal layer and the liquid crystal alignment film, preferably from 10 to 80 mol %, more preferably from 20 to 70 mol %, to the entire diamine component. Further, as the specific side chain type diamine compound, one type may be used alone, or two or more types may be used in combination, depending upon the respective properties.

As the diamine component for preparing the above polyimide type polymer, a diamine of the following formula [4b] (also referred to as a second diamine) is preferred.

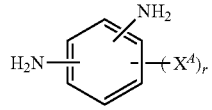

[4b]

$X^A$ is a structure selected from the following formula [4-1b] to formula [4-5b]. r is an integer of from 1 to 4, preferably 1.

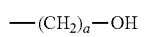

[4-1b]

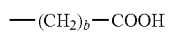

[4-2b]

[4-3b]

[4-4b]

—$X^d$—$X^e$—$X^f$—$X^g$

[4-5b]

a is an integer of from 0 to 4. Among them, from the viewpoint of the availability or easy synthesis of raw material, 0 or 1 is preferred. b is an integer of from 0 to 4. Among them, from the viewpoint of the availability or easy synthesis of raw material, 0 or 1 is preferred. $X^a$ and $X^b$ are each a $C_{1-12}$ hydrocarbon group. $X^c$ is a $C_{1-5}$ alkyl group.

$X^d$ is a single bond, —O—, —NH—, —N(CH$_3$)—, —CH$_2$O—, —CONH—, —NHCO—, —CON(CH$_3$)—, —N(CH$_3$)CO—, —COO— or —OCO—. Among them, preferred is a single bond, —O—, —CH$_2$O—, —CONH—, —CON(CH$_3$)— or —COO—. More preferred is, from the viewpoint of easy synthesis, a single bond, —O—, —CH$_2$O— or —COO—.

$X^e$ is a $C_{1-18}$ alkylene group or a $C_{6-24}$ organic group having a benzene ring, a cyclohexane ring or a heterocyclic ring, provided that an optional hydrogen atom on such a cyclic group may be substituted by a $C_{1-3}$ alkyl group, a $C_{1-3}$ alkoxy group, a $C_{1-3}$ fluorine-containing alkyl group, a $C_{1-3}$ fluorine-containing alkoxy group, or a fluorine atom. Among them, preferred is a $C_{2-12}$ alkylene group, or a $C_{6-24}$ organic group having at least one cyclic group selected from the group consisting of a benzene ring and a cyclohexane ring. More preferred from the viewpoint of easy synthesis and adhesion between the liquid crystal layer and the liquid crystal alignment film, is a $C_{2-12}$ alkylene group.

$X^f$ is a single bond, —O—, —NH—, —N(CH$_3$)—, —CH$_2$O—, —CONH—, —NHCO—, —CON(CH$_3$)—, —N(CH$_3$)CO—, —COO— or —OCO—. Among them, preferred is a single bond, —O—, —NHCO—, —N(CH$_3$) CO— or —OCO—. More preferred from the viewpoint of easy synthesis, is a single bond, —O—, —NHCO— or —OCO—.

$X^g$ is a structure selected from the following formula [4-a] to formula [4-f]. Among them, from the viewpoint of easy synthesis and adhesion between the liquid crystal layer and the liquid crystal alignment film, preferred is the following formula [4-a], formula [4-b] or formula [4-e].

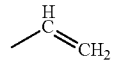

[4-a]

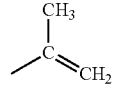

[4-b]

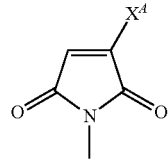

[4-c]

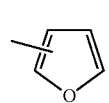

[4-d]

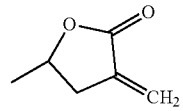

[4-e]

[4-f]

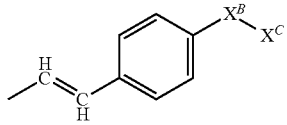

$X^A$ is a hydrogen atom or a benzene ring. $X^B$ is a single bond, or a cyclic group having a benzene ring, a cyclohexane ring or a heterocyclic ring. $X^C$ is a $C_{1-18}$ alkyl group, a $C_{1-18}$ fluorine-containing alkyl group, a $C_{1-18}$ alkoxy group or a $C_{1-18}$ fluorine-containing alkoxy group.

Specific examples of the second diamine may be second diamines as described from page 20 to page 22 in international publication WO2015/199148 and diamines of the formula [2-1] to the formula [2-15]. Among them, preferred is 2,4-aminophenol, 3,5-diaminophenol, 3,5-diamino benzyl alcohol, 2,4-diamino benzyl alcohol, 4,6-diaminoresorcinol, 2,4-diamino benzoic acid, 2,5-diaminobenzoic acid, 3,5-diaminobenzoic acid as described in the same publication, the formula [2-1], the formula [2-2], the formula [2-3], the formula [2-7], the formula [2-8], the formula [2-11], the formula [2-12] or the formula [2-15]. Particularly preferred, from the viewpoint of solubility of the polyimide type polymer in the solvent and the optical properties of the device, is 2,4-aminophenol, 3,5-di-aminophenol, 3,5-diamino benzyl alcohol, 3,5-diaminobenzoic acid as described in the publication, the formula [2-1], the formula [2-2], the formula [2-11] or the formula [2-12].

The proportion of the second diamine is, from the viewpoint of the optical properties of the device and adhesion between the liquid crystal layer and the liquid crystal alignment film, preferably from 10 to 70 mol %, more preferably from 20 to 60 mol %, to the entire diamine component. Further, as the second diamine, one type may be used alone, or two or more types may be used in combination, depending on the respective properties.

As the diamine component for preparing the above-mentioned polyimide type polymer, it is also possible to use, as the diamine, diamines other than the formula [4a] and [4b] (also referred to as other diamines).

Specifically, other diamines as described from page 27 to page 30 in international publication WO2015/012368 and diamine compounds of the formula [DA1] to formula [DA14] as described from page 30 to page 32 in the same publication may be mentioned. Further, as such other diamines, one type may be used alone, or two or more types may be used in combination, depending on the respective properties.

As the tetracarboxylic acid component for producing the above polyimide-type polymer, it is preferred to use a tetracarboxylic acid dianhydride of the following formula [5], or, as its derivative, a tetracarboxylic acid, a tetracarboxylic acid dihalide, a tetracarboxylic acid dialkyl ester or a tetracarboxylic acid dialkyl ester dihalide (collectively referred to as a specific tetracarboxylic acid component).

[5]

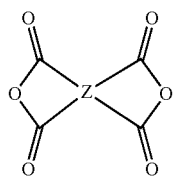

Z is a structure selected from the following formula [5a] to formula [5l].

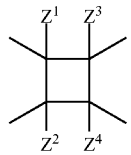
[5a]

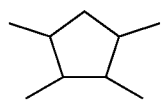
[5b]

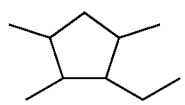
[5c]

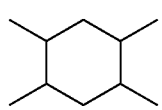
[5d]

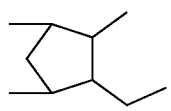
[5e]

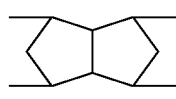
[5f]

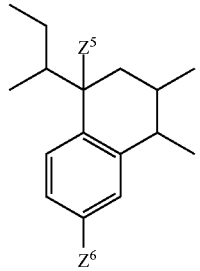
[5g]

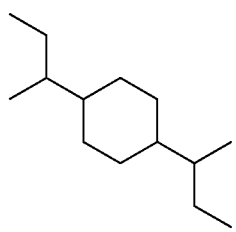
[5h]

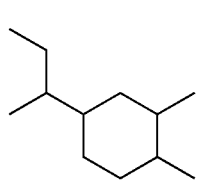
[5i]

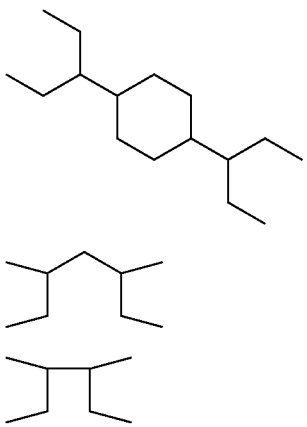

[5j]

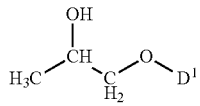

[5k]

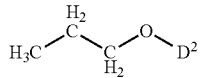

[5l]

$Z^1$ to $Z^4$ are each a hydrogen atom, a methyl group, a chlorine atom or a benzene ring. $Z^5$ and $Z^6$ are each a hydrogen atom or a methyl group.

Z in the above formula [5], $Z^1$ to $Z^4$ in the formula [5a], and $Z^5$ to $Z^6$ in the formula [5g] are as defined above.

Among them, in the formula [5], Z is, from the viewpoint of easy synthesis or easy polymerization reactivity at the time of producing a polymer, preferably a structure of the formula [5a], formula [5c], formula [5d], formula [5e], formula [5f], formula [5g], formula [5k] or formula [5l]. More preferably, it is a structure of the formula [5a], formula [5e], formula [5f], formula [5g], formula [5k] or formula [5l], and particularly preferably, from the viewpoint of the optical properties of the device, it is a structure of the formula [5a], formula [5e], formula [5f], formula [5g] or formula [5l].

The proportion of the specific tetracarboxylic acid component is preferably at least 1 mol % to the entire tetracarboxylic acid component. It is more preferably at least 5 mol %, particularly preferably at least 10 mol %. Most preferably, from the viewpoint of the optical properties of the device, it is from 10 to 90 mol %.

For the polyimide type polymer, it is possible to use other tetracarboxylic acid components other than the specific tetracarboxylic acid component. As such other tetracarboxylic acid components, specifically other tetracarboxylic acid components as described from page 34 to page 35 in international publication WO2015/012368 may be mentioned. As the specific tetracarboxylic acid component and other tetracarboxylic acid components, one type may be used alone, or two or more types may be used in combination depending on the respective properties.

The method for synthesizing a polyimide type polymer is not particularly limited. Usually it is obtained by reacting a diamine component and a tetracarboxylic acid component. Specifically, a method as described from page 35 to page 36 in international publication WO2015/012368 may be mentioned.

The reaction of a diamine component and a tetracarboxylic acid component is usually carried out in a solvent containing the diamine component and the tetracarboxylic acid component. The solvent to be used in such a case is not particularly limited so long as the resulting polyimide precursor is soluble therein.

Specifically, N-methyl-2-pyrrolidone, N-ethyl-2-pyrrolidone, γ-butyrolactone, N,N-dimethylformamide, N,N-dimethylacetamide, dimethyl sulfoxide or 1,3-dimethyl-imidazoridinone may be mentioned.

Further, in a case where solvent solubility of the polyimide precursor is high, it is possible to use methyl ethyl ketone, cyclohexanone, cyclopentanone, 4-hydroxy-4-methyl-2-pentanone or a solvent of the following formula [D1] to formula [D3].

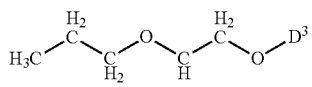

[D1]

[D2]

[D3]

$D^1$ and $D^2$ are each a $C_{1-3}$ alkyl group, and $D^3$ is a $C_{1-4}$ alkyl group.

Further, as the solvent, one type may be used alone, or two or more types may be used in combination. Further, even a solvent which does not dissolve the polyimide precursor, may be used as mixed to the above solvent within such a range that the resulting polyimide precursor will not precipitate. Further, water in the organic solvent inhibits the polymerization reaction and further causes hydrolysis of the formed polyimide precursor, and therefore, it is preferred to use an organic solvent which has been subjected to dehydration and drying.

The polyimide is a polyimide obtainable by ring closure of a polyimide precursor, and in this polyimide, the ring closure ratio of amic acid groups (also called imidization ratio) is not necessarily required to be 100% and may optionally be adjusted depending on the application or purpose. In particular, from the viewpoint of solubility of the polyimide type polymer in a solvent, it is preferably from 30 to 80%, more preferably from 40 to 70%.

The molecular weight of the polyimide type polymer is, in consideration of the strength of a liquid crystal alignment film obtainable therefrom, and the operation efficiency and coating properties at the time of forming a liquid crystal alignment film, preferably from 5,000 to 1,000,000, more preferably from 10,000 to 150,000, by a weight average molecular weight as measured by GPC (Gel Permeation Chromatography).

In a case of using a polysiloxane as the above-mentioned specific polymer, it is preferred to employ a polysiloxane obtainable by polycondensing an alkoxysilane of the following formula [A1], or a polysiloxane obtainable by polycondensing an alkoxysilane of the formula [A1] with an alkoxysilane of the following formula [A2] or formula [A3] (collectively referred to as a polysiloxane type polymer).

$$(A^1)_m Si(A^2)_n (OA^3)_p \quad [A1]$$

$A^1$ is the above formula [4-1a] or formula [4-2a]. $A^2$ is a hydrogen atom or a $C_{1-5}$ alkyl group. $A^3$ is a $C_{1-5}$ alkyl group. m is an integer of 1 or 2, n is an integer of from 0 to 2, and p is an integer of from 0 to 3, provided that m+n+p is 4.

$$(B^1)_m Si(B^2)_n (OB^3)_p \quad [A2]$$

$B^1$ is a $C_{2-12}$ organic group having at least one member selected from the group consisting of a vinyl group, an epoxy group, an amino group, a mercapto group, an isocyanate group, a methacryl group, an acryl group, an ureido group and a cinnamoyl group. $B^2$ is a hydrogen atom or a $C_{1-5}$ alkyl group. $B^3$ is a $C_{1-5}$ alkyl group. m is an integer of 1 or 2, n is an integer of from 0 to 2, p is an integer of from 0 to 3, provided that m+n+p is 4.

$$(D^1)_n Si(OD^2)_{4-n} \quad [A3]$$

$D^1$ is a hydrogen atom or a $C_{1-5}$ alkyl group. $D^2$ is a $C_{1-5}$ alkyl group. n is an integer of from 0 to 3.

Alkoxysilane of the Above Formula [A1]:

In the formula [A1], $A^1$, $A^2$, $A^3$, m, n and p are as defined above, but in particular, the following ones are, respectively, preferred. $A^1$ is, from such a viewpoint that it is possible to obtain high and stable vertical alignment of liquid crystal, preferably the structure of the above formula [4-1a]. Further, in the above formula [4-1a], details and preferred combinations of $X^1$, $X^2$, $X^3$, $X^4$, $X^5$, $X^6$ and n are as defined above in the above formula [4-1a]. $A^2$ is preferably a hydrogen atom or a $C_{1-3}$ alkyl group. $A^3$ is, from the viewpoint of the reactivity for polycondensation, preferably a $C_{1-3}$ alkyl group. m is, for easy synthesis, preferably 1, n is an integer of from 0 to 2, p is, from the viewpoint of the reactivity for polycondensation, preferably an integer of from 1 to 3, more preferably 2 or 3, provided that m+n+p is 4.

Specific examples of the alkoxysilane of the formula [A1] may be alkoxysilanes of the formula [2a-1] to formula [2a-32] as described from page 17 to page 21 in international publication WO2015/008846. Among them, an alkoxysilane of the formula [2a-9] to formula [2a-21], the formula [2a-25] to formula [2a-28] or the formula [2a-32] as described in the publication, is preferred.

Alkoxysilane of the Formula [A2]:

In the above formula [A2], $B^1$, $B^2$, $B^3$, m, n and p are as defined above. In particular, $B^1$ is, from the viewpoint of easy availability, preferably an organic group having a vinyl group, an epoxy group, an amino group, a methacryl group, an acryl group or a ureido group. More preferably, it is an organic group having a methacryl group, an acryl group or a ureido group. $B^2$ is preferably a hydrogen atom or a $C_{1-3}$ alkyl group. $B^3$ is, from the viewpoint of the reactivity for polycondensation, preferably a $C_{1-3}$ alkyl group. m is, for easy synthesis, preferably 1, n is an integer of from 0 to 2, p is, from the viewpoint of the reactivity for polycondensation, preferably an integer of from 1 to 3, more preferably 2 or 3, provided that m+n+p is 4.

Specific examples of the alkoxysilane of the formula [A2] may be specific examples of the alkoxysilane of the formula [2b] as described from page 21 to page 24 in international publication WO2015/008846.

Among them, allyl triethoxysilane, allyl trimethoxysilane, diethoxymethyl vinyl silane, dimethoxymethyl vinyl silane, triethoxy vinyl silane, vinyl trimethoxysilane, vinyl tris(2-methoxyethoxy)silane, 3-(triethoxysilyl)propyl methacrylate, 3-(trimethoxysilyl)propyl acrylate, 3-(trimethoxysilyl) propyl methacrylate, 3-glycidyloxypropyl(dimethoxy) methylsilane, 3-glycidyloxypropyl(diethoxy)methylsilane, 3-glycidyloxypropyltrimethoxysilane or 2-(3,4-epoxycyclohexyl)ethyltrimethoxysilane is preferred.

Alkoxysilane of the Formula [A3]:

In the above formula [A3], $D^1$, $D^2$ and n are as defined above. In particular, $D^1$ is preferably a hydrogen atom or a $C_{1-3}$ alkyl group. $D^2$ is, from the viewpoint of the reactivity for polycondensation, preferably a $C_{1-3}$ alkyl group. n is an integer of from 0 to 3. Specific examples of the alkoxysilane of the formula [A3] may be specific examples of the alkoxysilane of the formula [2c] as described from page 24 to page 25 in international publication WO2015/008846.

Further, as the alkoxysilane wherein n is 0 in the above formula [A3], tetramethoxysilane, tetraethoxysilane, tetrapropoxysilane or tetrabutoxysilane may be mentioned, and as the alkoxysilane of the above formula [A3], it is preferred to use such an alkoxysilane.

As the alkoxysilane of each of the above formulae [A1] to [A3], one type may be used alone, or two or more types may be used in combination, depending on the respective properties.

The polysiloxane type polymer is a polysiloxane obtainable by polycondensing the alkoxysilane of the above formula [A1], or a polysiloxane obtainable by polycondensing the alkoxysilane of the formula [A1] with the alkoxysilane of the formula [A2] or formula [A3]. That is, the polysiloxane type polymer is either one of a polysiloxane obtainable by polycondensing only the alkoxysilane of the formula [A1], a polysiloxane obtainable by polycondensing two types of alkoxysilanes of the formula [A1] and the formula [A2], a polysiloxane obtainable by polycondensing two types of alkoxysilanes of the formula [A1] and the formula [A3], and a polysiloxane obtainable by polycondensing three types of alkoxysilanes of the formula [A1], the formula [A2] and the formula [A3].

Among them, from the viewpoint of the reactivity for polycondensation, and the solubility of the polysiloxane type polymer in a solvent, preferred is a polysiloxane obtainable by polycondensing plural types of alkoxysilanes. That is, it is preferred to use either one type among a polysiloxane obtainable by polycondensing two types of alkoxysilanes of the formula [A1] and the formula [A2], a polysiloxane obtainable by polycondensing two types of alkoxysilanes of the formula [A1] and the formula [A3], and a polysiloxane obtainable by polycondensing three types of alkoxysilanes of the formula [A1], the formula [A2] and the formula [A3].

In the case of using plural types of alkoxysilanes in producing a polysiloxane type polymer, the proportion of the alkoxysilane of the formula [A1] is preferably from 1 to 40 mol %, more preferably from 1 to 30 mol %, in all alkoxysilanes. The proportion of the alkoxysilane of the formula [A2] is preferably from 1 to 70 mol %, more preferably from 1 to 60 mol %, in all alkoxysilanes. Further, the proportion of the alkoxysilane of the formula [A3] is preferably from 1 to 99 mol %, more preferably from 1 to 80 mol %, in all alkoxysilanes.

The method for polycondensation for a polysiloxane type polymer is not particularly limited. Specifically, a method described from page 26 to page 29 in international publication WO2015/008846 may be mentioned.

In the polycondensation reaction to produce a polysiloxane type polymer, in a case where plural types of alkoxysilanes of the formula [A1], the formula [A2] and the formula [A3] are to be used, the reaction may be conducted by using a mixture having the plural types of alkoxysilanes premixed, or the reaction may be conducted by sequentially adding the plural types of alkoxysilanes.

In the present invention, a solution of the polysiloxane type polymer obtained by the above method may be used as it is, as the specific polymer, or, if necessary, the solution of the polysiloxane type polymer obtained by the above method, may be concentrated, or diluted by adding a solvent, or may be replaced with another solvent, to use it as the specific polymer.

The solvent to be used for dilution (also referred to as an additional solvent) may be a solvent to be used for the polycondensation reaction or another solvent. Such an additional solvent is not particularly limited so long as the polysiloxane type polymer is homogeneously dissolved, and one type, or two or more types, may be optionally selected for use. As such an additional solvent, in addition to the solvent to be used for the polycondensation reaction, a ketone type solvent such as acetone, methyl ethyl ketone or methyl isobutyl ketone, or an ester type solvent such as methyl acetate, ethyl acetate or ethyl lactate, may be mentioned.

Further, in a case where as the specific polymer, a polysiloxane type polymer and other polymer are to be used, it is preferred that before mixing other polymer to the polysiloxane type polymer, an alcohol formed during the polycondensation reaction of the polysiloxane type polymer is distilled off under normal pressure or under reduced pressure.

The liquid crystal alignment treating agent of the present invention is a solution for forming a liquid crystal alignment film, and a solution comprising the specific polymer having a specific side chain structure of the above formula [4-1a] or formula [4-2a] and a solvent.

The specific polymer having a specific side chain structure is not particularly limited, but is preferably at least one type of a polymer selected from the group consisting of an acrylic polymer, a methacrylic polymer, a novolak resin, a polyhydroxystyrene, a polyimide precursor, a polyimide, a polyamide, a polyester, cellulose and a polysiloxane. Among them, a polyimide precursor, a polyimide or a polysiloxane is preferred. Further, as the specific polymer, one type of these polymers may be used alone, or two or more types of them may be used in combination.

The entire polymer component in the liquid crystal alignment treating agent may entirely be the specific polymer, or may have other polymers mixed. At that time, the content of such other polymers may be from 0.5 to 15 parts by mass, preferably from 1 to 10 parts by mass, to 100 parts by mass of the specific polymer. As such other polymers, the above-mentioned polymers having no specific side chain structure of the formula [4-1a] or the formula [4-2a] may be mentioned.

The content of the solvent in the liquid crystal alignment treating agent may suitably be selected with a view to obtaining the desired film thickness and depending on the method for applying the liquid crystal alignment treating agent. In particular, from the viewpoint of forming a uniform vertical liquid crystal alignment film by coating, the content of the solvent in the liquid crystal alignment treating agent is preferably from 50 to 99.9 mass %, more preferably from 60 to 99 mass %, particularly preferably from 65 to 99 mass %.

The solvent to be used in the liquid crystal alignment treating agent is not particularly limited as long as it is a solvent capable of dissolving the specific polymer. In particular, in a case where the specific polymer is a polyimide precursor, a polyimide, a polyamide or polyester, or in a case where solubility in a solvent, of an acrylic polymer, a methacrylic polymer, a novolac resin, a polyhydroxystyrene, cellulose or a polysiloxane is low, it is preferred to use a solvent as shown below (also referred to as a class A solvent).

For example, N,N-dimethylformamide, N,N-dimethylacetamide, N-methyl-2-pyrrolidone, N-ethyl-2-pyrrolidone, dimethyl sulfoxide, γ-butyrolactone, 1,3-dimethyl-imidazolidinone, methyl ethyl ketone, cyclohexanone, cyclopentanone, 4-hydroxy-4-methyl-2-pentanone, etc. may be mentioned. Among them, it is preferred to use N-methyl-2-pyrrolidone, N-ethyl-2-pyrrolidone or γ-butyrolactone. Further, they may be used alone, or may be used as mixed.

In a case where the specific polymer is an acrylic polymer, a methacrylic polymer, a novolac resin, a polyhydroxystyrene, cellulose or a polysiloxane, and further in a case where the specific polymer is a polyimide precursor, a polyimide, a polyamide or a polyester, and the solubility of such a specific polymer in a solvent is low, it is possible to use the following solvent (also referred to as a class B solvent).

Specific examples of the class B solvent may be class B solvents as described from page 58 to page 60 in international publication WO2014/171493. Among them, it is preferred to use 1-hexanol, cyclohexanol, 1,2-ethanediol, 1,2-propanediol, propylene glycol monobutyl ether, ethylene glycol monobutyl ether, dipropylene glycol dimethyl ether, cyclohexanone, cyclopentanone, or a solvent of the above formula [D1] to formula [D3].

Further, at the time of using such a class B solvent, for the purpose of improving the coating properties of the liquid crystal alignment treating agent, it is preferred to use, in combination, said class A solvent such a N-methyl-2-pyrrolidone, N-ethyl-2-pyrrolidone or γ-butyrolactone, particularly γ-butyrolactone.

The class B solvent is capable of improving the coating properties and surface smoothness of the liquid crystal alignment film at the time of applying the liquid crystal alignment treating agent, and therefore, in a case where a polyimide precursor, a polyimide, a polyamide or a polyester is used as the specific polymer, it is preferred to use it in combination with said class A solvent. At that time, the class B solvent is preferably from 1 to 99 mass % of the entire solvent contained in the liquid crystal alignment treating agent. In particular, it is preferably from 10 to 99 mass %, more preferably from 20 to 95 mass %.

To the liquid crystal alignment treating agent, from the viewpoint of the optical properties of the device, it is preferred to introduce a compound (also referred to as a specific compound (A)) having at least one member selected from the group consisting of the following formula [b-1] to formula [b-11].

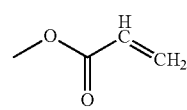

[b-1]

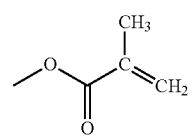

[b-2]

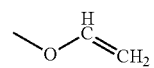

[b-3]

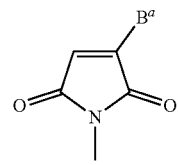

[b-4]

-continued

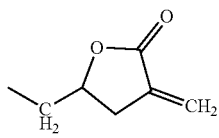
[b-5]

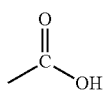
[b-6]

[b-7]

[b-8]

[b-9]

[b-10]

[b-11]

$B^a$ is a hydrogen atom or a benzene ring. $B^b$ to $B^d$ are each a $C_{1-5}$ alkyl group.

More specific examples of the specific compound (A) may be compounds of the following formula [b-1a] to formula [b-18a], which are preferred.

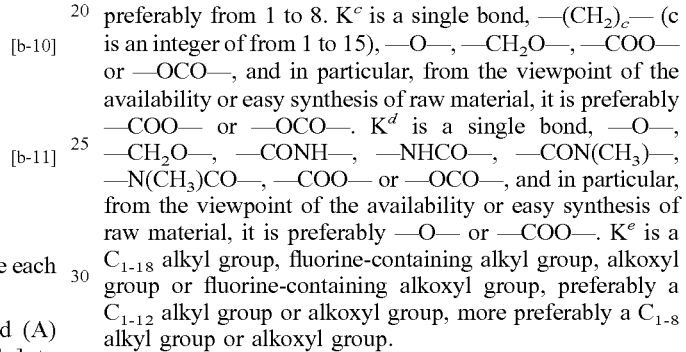
[b-1a]
[b-2a]
[b-3a]

$k^1$ is an integer of from 1 to 12, and especially from the viewpoint of the optical properties of the device, it is preferably from 1 to 8. $k^2$ is an integer of from 0 to 4, and especially from the viewpoint of the optical properties of the device, it is preferably 1 or 2. $K^a$ is a single bond, —O—, —CH$_2$O—, —CONH—, —NHCO—, —CON(CH$_3$)—, —N(CH$_3$)CO—, —COO— or —OCO—, and particularly, from the viewpoint of availability or easy synthesis of raw material, it is preferably —O— or —COO—. $K^b$ is a $C_{1-18}$ alkyl group, fluorine-containing alkyl group, alkoxyl group or fluorine-containing alkoxyl group. Among them, preferred is a $C_{1-12}$ alkyl group or alkoxyl group, and more preferred is a $C_{1-8}$ alkyl group or alkoxyl group.

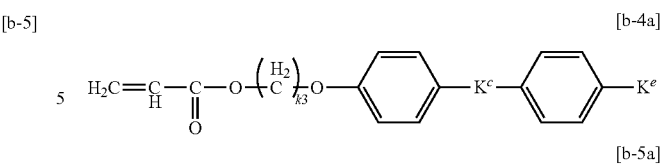
[b-4a]

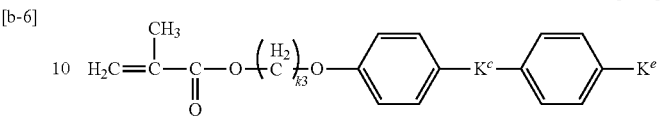
[b-5a]

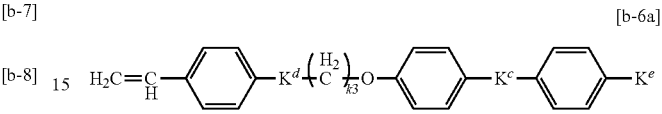
[b-6a]

$k^3$ is an integer of from 1 to 12, and in particular, from the viewpoint of the optical properties of the device, it is preferably from 1 to 8. $K^c$ is a single bond, —(CH$_2$)$_c$— (c is an integer of from 1 to 15), —O—, —CH$_2$O—, —COO— or —OCO—, and in particular, from the viewpoint of the availability or easy synthesis of raw material, it is preferably —COO— or —OCO—. $K^d$ is a single bond, —O—, —CH$_2$O—, —CONH—, —NHCO—, —CON(CH$_3$)—, —N(CH$_3$)CO—, —COO— or —OCO—, and in particular, from the viewpoint of the availability or easy synthesis of raw material, it is preferably —O— or —COO—. $K^e$ is a $C_{1-18}$ alkyl group, fluorine-containing alkyl group, alkoxyl group or fluorine-containing alkoxyl group, preferably a $C_{1-12}$ alkyl group or alkoxyl group, more preferably a $C_{1-8}$ alkyl group or alkoxyl group.

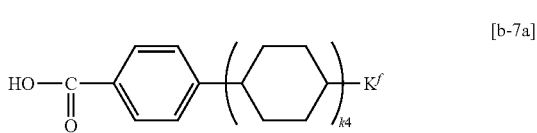
[b-7a]

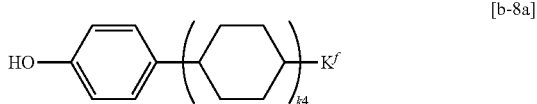
[b-8a]

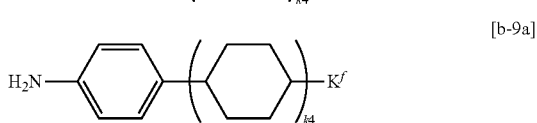
[b-9a]

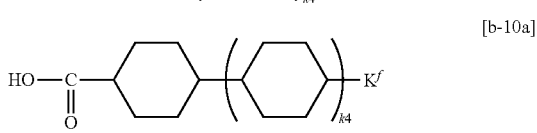
[b-10a]

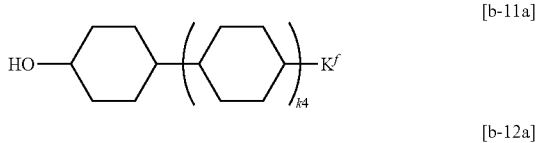
[b-11a]

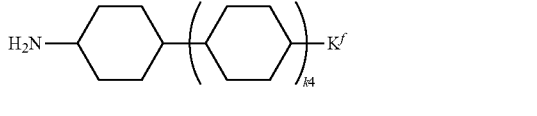
[b-12a]

$k^4$ is an integer of from 0 to 4, and particularly, from the viewpoint of the optical properties of the device, it is preferably 1 or 2. $K^f$ is a $C_{1-18}$ alkyl group, fluorine-containing alkyl group, alkoxyl group or fluorine-containing alkoxyl group, preferably a $C_{1-12}$ alkyl group or alkoxyl group, more preferably a $C_{1-8}$ alkyl group or alkoxyl group.

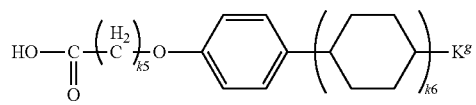
[b-13a]

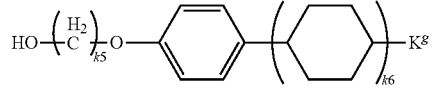
[b-14a]

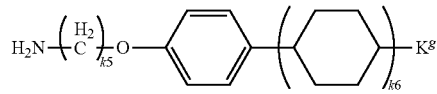
[b-15a]

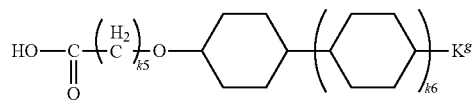
[b-16a]

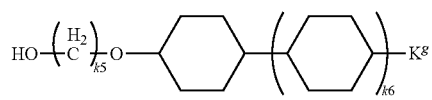
[b-17a]

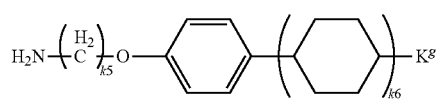
[b-18a]

$k^5$ is an integer of from 1 to 12, and from the viewpoint of the optical properties of the device, it is preferably from 1 to 8. $k^6$ is an integer of from 0 to 4, and from the viewpoint of the optical properties of the device, it is preferably 1 or 2. $K^g$ is a $C_{1-18}$ alkyl group, fluorine-containing alkyl group, alkoxyl group or fluorine-containing alkoxyl group, preferably a $C_{1-12}$ alkyl group or alkoxyl group, more preferably a $C_{1-8}$ alkyl group or alkoxyl group.

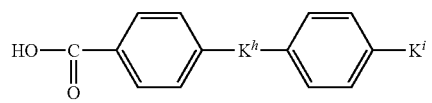
[b-19a]

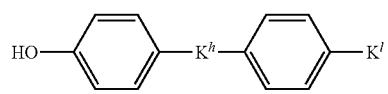
[b-20a]

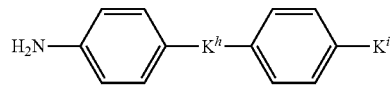
[b-21a]

$K^h$ is a single bond, —$(CH_2)_c$— (c is an integer of from 1 to 15), —O—, —$CH_2O$—, —COO— or —OCO—, and from the viewpoint of the availability or easy synthesis of raw material, it is preferably —COO— or —OCO—. $K^i$ is a $C_{1-18}$ alkyl group, fluorine-containing alkyl group, alkoxyl group or fluorine-containing alkoxyl group, preferably a $C_{1-12}$ alkyl group or alkoxyl group, more preferably a $C_{1-8}$ alkyl group or alkoxyl group.

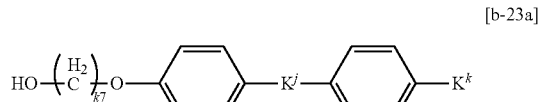
[b-22a]

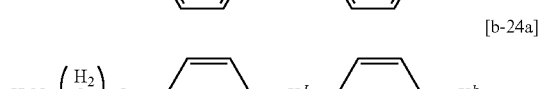
[b-23a]

[b-24a]

$k^7$ is an integer of from 1 to 12, and in particular, from the viewpoint of optical properties, it is preferably from 1 to 8. $K^j$ is a single bond, —$(CH_2)_c$— (c is an integer of from 1 to 15), —O—, —$CH_2O$—, —COO— or —OCO—, and from the viewpoint of the availability or easy synthesis of raw material, it is preferably —COO— or —OCO—. $K^k$ is a $C_{1-18}$ alkyl group, fluorine-containing alkyl group, alkoxyl group or fluorine-containing alkoxyl group, preferably a $C_{1-12}$ alkyl group or alkoxyl group, more preferably a $C_{1-18}$ alkyl group or alkoxyl group.

Among them, the above formula [b-1a], formula [b-2a], formula [b-7a], formula [b-8a], formula [b-10a], formula [b-11a], formula [b-13a], formula [b-14a], formula [b-16a] or formula [b-17a] is more preferred.

The proportion of the specific compound (A) in the liquid crystal alignment treating agent is, from the viewpoint of the optical properties of the liquid crystal display device, preferably from 0.1 to 30 parts by mass, more preferably from 0.5 to 20 parts by mass, particularly preferably from 1 to 10 parts by mass, to 100 parts by mass of the specific polymer. One of these compounds may be used alone, or two or more of them may be used in combination, depending on the respective properties.

In order to increase the strength of the liquid crystal alignment film, the liquid crystal alignment treating agent preferably contains a compound having an epoxy group, an isocyanate group, an oxetane group or a cyclocarbonate group, or a compound having at least one type of a group selected from the group consisting of a hydroxy group, a hydroxy alkyl group and a lower alkoxyalkyl group (also referred to collectively as a crosslinkable compound). Two or more of such group are required to be present in the compound.

Specific examples of the crosslinkable compound having an epoxy group or an isocyanate group, may be crosslinkable compounds having an epoxy group or an isocyanate group as described from page 63 to page 64 in international publication WO2014/171493.

Specific examples of the crosslinkable compound having an oxetane group, may be crosslinkable compounds of the formula [4a] to formula [4k] as published from page 58 to page 59 in international publication WO2011/132751.

Specific examples of the crosslinkable compound having a cyclocarbonate group, may be crosslinkable compounds of the formula [5-1] to formula [5-42] as published from page 76 to page 82 in international publication WO2012/014898.

Specific examples of the crosslinkable compound having a hydroxy group, a hydroxyalkyl group and a lower alkoxyalkyl group, may be melamine derivatives or benzoguanamine derivatives as described from page 65 to page 66 in WO2014/171493, and crosslinkable compounds of the formula [6-1] to formula [6-48] as published from page 62 to page 66 in international publication WO2011/132751.

The content of the specific crosslinkable compound in the liquid crystal alignment treating agent is, based on 100 parts by mass of the entire polymer component, preferably from 0.1 to 100 parts by mass, and in order to facilitate the cross-linking reaction and to let the desired effect be better developed, more preferably from 0.1 to 50 parts by mass, most preferably from 1 to 30 parts by mass.

To the liquid crystal alignment treating agent, it is preferred to incorporate at least one type of a generator (also referred to as a specific generator) selected from the group consisting of a photo-radical generator, a photoacid generator and a photobase generator.

Specific examples of the specific generator may be specific generators as described from page 54 to page 56 in WO2014/171493. Among them, as the specific generator, it is preferred to use a photo-radical generator from the viewpoint of adhesion between the liquid crystal layer and the liquid crystal alignment film in the liquid crystal display device.

To the liquid crystal alignment treating agent, it is preferred to incorporate a compound (also referred to as a specific adhesion compound) having at least one type of structure selected from the group consisting of the following formula [e-1] to formula [e-8], for the purpose of improving the adhesion between the liquid crystal layer and the vertical liquid crystal alignment film.

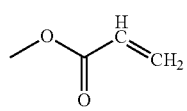
[e-1]

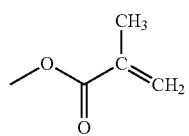
[e-2]

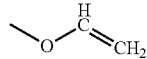
[e-3]

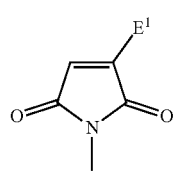
[e-4]

[e-5]

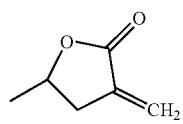
[e-6]

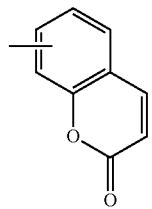
[e-7]

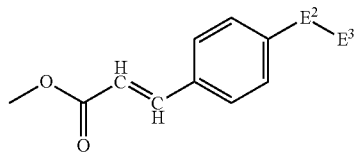
[e-8]

$E^1$ is a hydrogen atom or a benzene ring. $E^2$ is a cyclic group having a benzene ring, a cyclohexane ring or a heterocyclic ring. $E^3$ is a $C_{1-18}$ alkyl group, fluorine-containing alkyl group, alkoxy group or fluorine-containing alkoxy group.

Specific examples of the specific adhesion compound may be compounds of the formula [6] as described from page 43 to page 46 in international publication WO2015/012368. Further, it is also possible to use ones described from page 61 to page 63 in international publication WO2014/171493.

The content of the specific adhesion compound in the liquid crystal alignment treating agent is, based on 100 parts by mass of the polymer component, preferably from 0.1 to 150 parts by mass, and in order to facilitate the crosslinking reaction and to let the desired effect be better developed, more preferably from 1 to 100 parts by mass, most preferably from 1 to 50 parts by mass.

As the specific adhesion compound, one type may be used alone, or two or more types may be used in combination, depending on the respective properties.

To the liquid crystal alignment treating agent, in order to promote charge transfer in the liquid crystal alignment film, or to facilitate charge missing of the device, it is also possible to incorporate a nitrogen-containing heterocyclic amine compound of the formula [M1] to formula [M156] as published from page 69 to page 73 in international publication WO2011/132751. This amine compound may be added directly to the liquid crystal alignment treating agent, but is preferably added after being formed into a solution at a concentration of from 0.1 to 10 mass %, preferably from 1 to 7 mass %, with a suitable solvent. This solvent is not particularly limited so long as it is an organic solvent for dissolving the specific polymer.

In the liquid crystal alignment treating agent, it is possible to use a compound to improve the uniformity in thickness or the surface smoothness of the liquid crystal alignment film when the liquid crystal aligning agent is applied. Further, it is also possible to use such a compound to improve the adhesion between the liquid crystal alignment film and the substrate.

The compound to improve the uniformity in thickness or the surface smoothness of the liquid crystal alignment film, may, for example, be a fluorinated surfactant, a silicone type surfactant, a non-ionic surfactant, etc. Specifically, surfactants as described on page 67 in international publication WO2014/171493 may be mentioned. Further, its proportion is preferably from 0.01 to 2 parts by mass, more preferably from 0.01 to 1 part by mass, to 100 parts by mass of the entire polymer component contained in the liquid crystal alignment treating agent.

Specific examples of the compound to improve the adhesion between the liquid crystal alignment film and the substrate, may be compounds described from page 67 to page 69 in international publication WO2014/171493. Further, its proportion is preferably from 0.1 to 30 parts by mass, more preferably from 1 to 20 parts by mass, to 100 parts by mass of the entire polymer component contained in the liquid crystal alignment treating agent.

To the liquid crystal alignment treating agent, in addition to the compounds as described above, a dielectric or conductive material may be added for the purpose of changing the electrical properties such as the dielectric constant or the conductivity of the liquid crystal alignment film.

<Methods for Preparation of Liquid Crystal Alignment Film and Liquid Crystal Display Device>

The substrates to be used in a liquid crystal display device are not particularly limited so long as they are highly transparent substrates, and it is possible to use, in addition to glass substrates, plastic substrates such as acrylic substrates, polycarbonate substrates, PET (polyethylene terephthalate) substrates, etc., and, further, it is possible to use their films. In a case where the liquid crystal display device is to be used as a reverse type device, for e.g. a light control window, the substrates are preferably plastic substrates or films. Further, from the viewpoint of simplification of the process, it is preferred to use substrates provided with ITO (Indium Tin Oxide) electrodes, IZO (Indium Zinc Oxide) electrodes, IGZO (Indium Gallium Zinc Oxide) electrodes, organic conductive films, etc. for liquid crystal driving. Further, in the case of a reflection type reverse type device, as a substrate for only one side, it is possible to use a substrate having a dielectric multi-layer film or a metal such as a silicon wafer or aluminum formed.

In the liquid crystal display device, at least one of the substrates has a liquid crystal alignment film to vertically align liquid crystal molecules. This liquid crystal alignment film is obtainable by applying a liquid crystal alignment treating agent on a substrate and firing it, followed by alignment treatment by e.g. rubbing treatment or light irradiation. However, in the case of the liquid crystal alignment film of the present invention, it can be used as a liquid crystal alignment film even without such alignment treatment.

The method for applying the liquid crystal alignment treating agent is not particularly limited, but industrially, screen printing, offset printing, flexographic printing, an ink-jet method, a dip method, a roll coater method, a slit coater method, a spinner method, a spraying method, etc. are available, and depending on the type of the substrate or the desired film thickness of the liquid crystal alignment film, the method may be suitably selected.

After applying the liquid crystal alignment treating agent on a substrate, it is possible to evaporate the solvent by a heating means such as a hot plate, a heat circulating oven or an IR (infrared) oven, at a temperature of from 30 to 300° C., preferably from 30 to 250° C., depending on the type of the substrate or the solvent used for the liquid crystal alignment treating agent. Particularly, in the case of using a plastic substrate as the substrate, it is preferred to conduct the treatment at a temperature of from 30 to 150° C.

With respect to the thickness of the liquid crystal alignment film after firing, if it is too thick, such will be disadvantageous in terms of power consumption of the device, and if it is too thin, the reliability of the device may sometimes be low, and therefore, it is preferably from 5 to 500 nm, more preferably from 10 to 300 nm, particularly preferably from 10 to 250 nm.

In the liquid crystal composition to be used in the liquid crystal display device, it is possible to incorporate a spacer to control the space (also referred to as the gap) between electrodes in the device.

The method for injection of the liquid crystal composition is not particularly limited, but, for example, the following methods may be mentioned. That is, in a case where glass substrates are used as the substrates, a method may be mentioned in which a pair of substrates each having a liquid crystal alignment film formed, may be used, and four sides of the substrate on one side is coated with a sealing agent except for a portion, and then the substrate on the other side is bonded so that the liquid crystal alignment films face inside, to prepare an empty cell. Then, from the portion where the sealant is not applied, the liquid crystal composition is vacuum-injected to obtain a liquid crystal composition-injected cell. Further, in the case of using plastic substrates or films as the substrates, a method may be mentioned in which a pair of substrates each having a liquid crystal alignment film formed, are prepared, and on the substrate on one side, the liquid crystal composition is dropped by an ODF (One Drop Filling) method, an inkjet method, etc., and then, the substrate on the other side is bonded, to obtain a liquid crystal composition-injected cell. In the liquid crystal display device of the present invention, adhesion between the liquid crystal layer and the liquid crystal alignment film is high, so that a sealant may not be applied to four sides of the substrate.

The gap of the liquid crystal display device may be controlled by the above-mentioned spacer, etc. The method may be, as described above, a method of introducing a spacer having a desired size in the liquid crystal composition, or a method of using a substrate having a column spacer having a desired size. Further, in a case where plastic or film substrates are used as the substrates, and bonding of the substrates is conducted by lamination, it is possible to control the gap without introducing a spacer.

The size of the gap of the liquid crystal display device is preferably from 1 to 100 µm, more preferably from 1 to 50 µm, particularly preferably from 2 to 30 µm. If the gap is too small, the contrast of the device tends to be low, and if it is too large, the driving voltage of the device tends to be high.

The liquid crystal display device of the present invention is obtainable by irradiating a liquid crystal composition disposed between a pair of substrates provided with electrodes with ultraviolet light from an ultraviolet irradiation apparatus, to conduct curing to form a cured product of the liquid crystal composition. Curing of the liquid crystal composition is carried out by irradiating the cell having the liquid crystal composition injected, with ultraviolet light. The ultraviolet irradiation apparatus to be used at that time may be a known one.

As the light source of the ultraviolet irradiation apparatus, for example, a metal halide lamp, a high pressure mercury lamp, an ultraviolet light emitting diode, etc. may be mentioned. Among them, an ultraviolet light emitting diode (an apparatus using an ultraviolet light emitting diode will be also referred to as a specific ultraviolet irradiation apparatus) is preferred, since it is thereby possible to emit ultraviolet light of a specific wavelength without a loss of illumination intensity even without using a wavelength selective filter, and further, it is possible to suppress heat to be generated from the light source. Further, light sources of the irradiation apparatus are preferably disposed above and below the apparatus, whereby it is possible to further accelerate the curing of the liquid crystal composition.

A specific example of the specific ultraviolet irradiation apparatus may be a specific ultraviolet irradiation apparatus-1 or -2 as described from page 39 to page 43 in international publication WO2015/199148. In particular, from the viewpoint of the optical properties of the device, the specific ultraviolet irradiation apparatus-2 is preferred. Further, the wavelength of ultraviolet light from the ultraviolet light emitting diode is preferably from 200 to 500 nm, more preferably from 250 to 450 nm, particularly preferably from 300 to 400 nm. Further, the irradiation intensity of the ultraviolet light emitting diode is preferably from 0.1 to 150 mW/cm$^2$, more preferably from 1 to 100 mW/cm$^2$, particularly preferably from 1 to 40 mW/cm$^2$. In addition, the irradiation time is preferably from 1 to 600 seconds, more preferably from 5 to 300 seconds, particularly preferably from 10 to 120 seconds.

The surface temperature of the liquid crystal composition-injected cell i.e. the object to be treated by irradiation with ultraviolet light by using the specific ultraviolet irradiation apparatus-1 or -2, is preferably from 0 to 100° C., more preferably from 10 to 50° C., particularly preferably from 15 to 30° C.

As described above, by using the specific liquid crystal composition and the specific liquid crystal alignment film, it is possible to obtain a liquid crystal display device which has good optical properties, i.e. transparency during no application of a voltage and scattering properties at the time of application of a voltage application being good, and further adhesion between the liquid crystal layer and the liquid crystal alignment film being high, and which is capable of maintaining these characteristics even in an environment exposed to high temperature and high humidity or irradiation with light for a long time.

EXAMPLES

Hereinafter, the present invention will be described in detail with reference to Examples, but the present invention is not limited thereto. Abbreviations used in the following are as follows.

<Specific Compounds (1)>

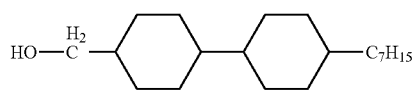

T1

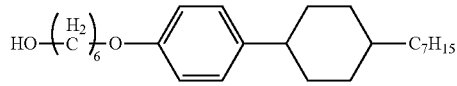

T2

<Specific Compound (2)>

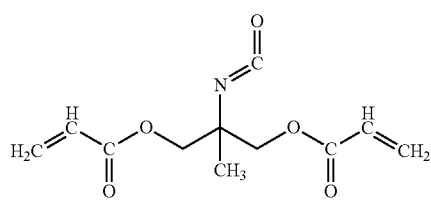

S1

<Specific Compound (3)>

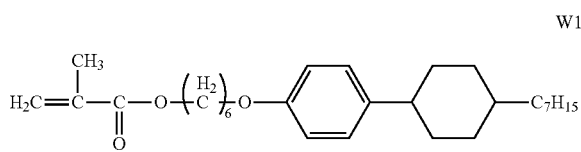

W1

<Specific Side-Chain Type Diamines>

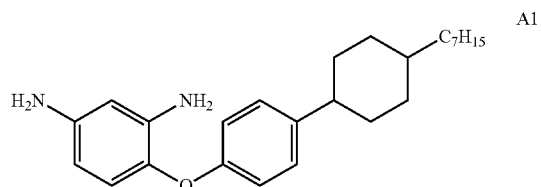

A1

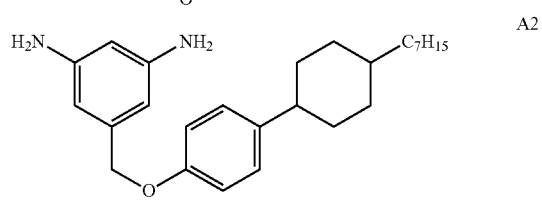

A2

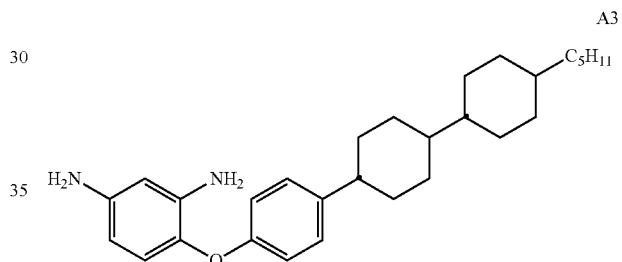

A3

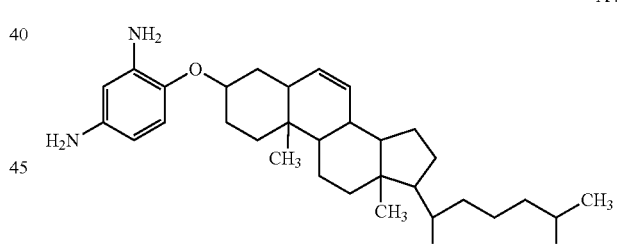

A4

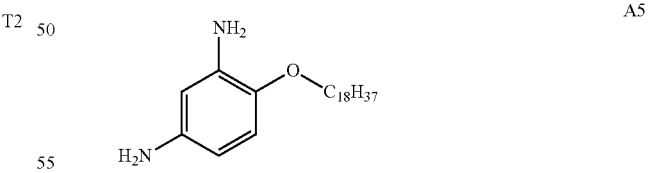

A5

<Second Diamines>

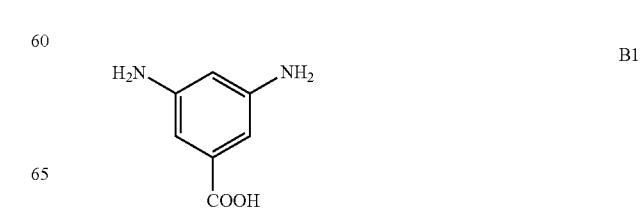

B1

-continued

B2

[Structure: 3,5-diaminobenzoic acid ester with 2-(methacryloyloxy)ethyl group]

B3

[Structure: diaminophenyl ether linked via hexyl chain to 4-vinylbenzoate]

<Other Diamine>

C1

[Structure: 1,3-diaminobenzene (m-phenylenediamine)]

<Specific Tetracarboxylic Acid Component>

D1

[Structure: cyclobutane tetracarboxylic dianhydride]

D2

[Structure: bicyclic tetracarboxylic dianhydride]

D3

[Structure: tricyclic anhydride structure]

D4

[Structure: bis-anhydride of bicyclic type]

<Raw Material Monomer for Polysiloxane Type Polymer>

E1: alkoxysilane monomer of the following formula [E1], E2: octadecyl triethoxysilane, E3: 3-methacryloxypropyl trimethoxysilane, E4: 3-ureidopropyl triethoxysilane, E5: tetraethoxysilane

E1

$(MeO)_3Si$—[propoxyphenyl-cyclohexyl-$C_5H_{11}$]

<Specific Compound (A)>

Q1

$HO-\underset{\underset{O}{\|}}{C}$—[bicyclohexyl]—$C_5H_{11}$

<Specific Crosslinkable Compounds>

K1

[Structure: bisphenol with four hydroxymethyl and two hydroxyl groups, central C(CH$_3$)$_2$]

K2

[Structure: bis(glycidyl)aminomethyl cyclohexane diepoxide]

<Specific Generator>

N1

[Structure: morpholinophenyl ketone with dimethylamino and benzyl groups, ethyl substituent]

<Specific Adhesion Compounds>

M1

[Structure: diacrylate of triglycerol with three OH groups]

-continued

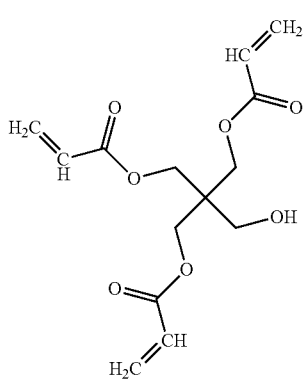

M2

<Solvents>
NMP: N-methyl-2-pyrrolidone, γ-BL: γ-butyrolactone, BCS: ethylene glycol monobutyl ether, PB: propylene glycol monobutyl ether, PGME: propylene glycol monomethyl ether, ECS: ethylene glycol monoethyl ether, EC: diethylene glycol monoethyl ether "Measurement of Molecular Weight of Polyimide Type Polymer"

Measured as follows by using a normal temperature gel permeation chromatography (GPC) apparatus (GPC-101, manufactured by Showa Denko K.K.), column (KD-803, KD-805) (manufactured by Shodex).

Column temperature: 50° C.

Eluent: N,N'-dimethylformamide (additives: lithium bromide monohydrate (LiBr—$H_2O$): 30 mmol/L (liter), phosphoric acid anhydride crystals (o-phosphoric acid): 30 mmol/L, tetrahydrofuran (THF): 10 ml/L)

Flow rate: 1.0 ml/min

Standard samples for preparing a calibration curve: TSK standard polyethylene oxides (molecular weight: about 900,000, 150,000, 100,000 and 30,000) (manufactured by Tosoh Corporation) and polyethylene glycols (molecular weight: about 12,000, 4,000 and 1,000) (manufactured by Polymer Laboratories Ltd.).

"Measurement of Imidization Ratio of Polyimide Type Polymer"

20 mg of a polyimide powder was put in an NMR (nuclear magnetic resonance) sample tube (NMR sampling tube standard, φ 5 (manufactured by Kusano Kagaku)), and deuterated dimethyl sulfoxide (DMSO-d6, 0.05 mass % TMS (tetramethylsilane) mixed product) (0.53 ml) was added, followed by applying ultrasonic waves to completely dissolve the mixture. With respect to this solution, proton NMR at 500 MHz was measured by NMR measuring machine (JNW-ECA500) (manufactured by JEOL Datum Ltd.). The imidization ratio was obtained by the following formula by determining, as standard protons, the protons derived from a structure that does not change before and after the imidization, and by using the peak integration value of such protons and the proton peak integration value derived from NH groups of the amide acid appearing in the vicinity of from 9.5 ppm to 10.0 ppm.

Imidization ratio (%)=$(1-\alpha \cdot x/y) \times 100$ wherein x is the proton peak integration value derived from NH groups of the amide acid, y is the peak integration value of the standard protons, and α is the ratio of the number of the standard protons to one NH group proton of the amide acid in the case of a polyamic acid (imidization ratio being 0%).

Synthesis of Polyimide Type Polymer

Synthesis Example 1

D2 (3.83 g, 15.3 mmol), A1 (5.90 g, 15.5 mmol) and C1 (2.51 g, 23.2 mmol) were mixed in NMP (33.5 g) and reacted at 80° C. for 5 hours, whereupon D1 (4.50 g, 22.9 mmol) and NMP (16.7 g) were added and reacted at 40° C. for 6 hours, to obtain a polyamic acid solution (1) wherein the resin solid content concentration (hereinafter referred to also as $C_R$) was 25 mass %. Of this polyamic acid, the number average molecular weight (also referred to as Mn) was 18,300, and the weight average molecular weight (also referred to as Mw) was 61,300.

Synthesis Example 2

The polyamic acid solution (1) (30.0 g) obtained in Synthesis Example 2 was diluted to 6 mass % by adding NMP, and then, as an imidization catalyst, acetic anhydride (3.85 g) and pyridine (2.35 g) were added, followed by a reaction at 60° C. for 2 hours. This reaction solution was poured into methanol (450 ml), and the resulting precipitate was collected by filtration. This precipitate was washed with methanol, and dried at 100° C. under reduced pressure to obtain a polyimide powder (2). Of this polyimide, the imidization ratio was 55%, Mn was 15,700, and Mw was 43,200.

Synthesis Example 3

D2 (1.53 g, 6.12 mmol), A1 (2.36 g, 6.20 mmol), B2 (2.05 g, 7.76 mmol) and C1 (0.17 g, 1.57 mmol) were mixed in NMP (15.8 g), and reacted at 80° C. for 5 hours, whereupon D1 (1.80 g, 9.18 mmol) and NMP (7.90 g) were added and reacted at 40° C. for 6 hours, to obtain a polyamic acid solution (3) wherein $C_R$ was 25 mass %. Of this polyamic acid, Mn was 16,100, and Mw was 57,300.

Synthesis Example 4

D4 (1.01 g, 5.10 mmol), A2 (2.04 g, 5.17 mmol), B1 (0.20 g, 1.31 mmol) and B2 (1.71 g, 6.47 mmol) were mixed in γ-BL (17.2 g), and reacted at 60° C. for 4 hours, whereupon D1 (1.50 g, 7.65 mmol) and γ-BL (8.60 g) were added and reacted at 40° C. for 6 hours, to obtain a polyamic acid solution (4) wherein $C_R$ was 20 mass %. Of this polyamic acid, Mn was 13,100, and Mw was 44,500.

Synthesis Example 5

D4 (0.51 g, 2.57 mmol), A3 (1.68 g, 3.88 mmol), B1 (0.79 g, 5.19 mmol) and B3 (1.37 g, 3.87 mmol) were mixed in γ-BL (16.9 g), and reacted at 60° C. for 4 hours, whereupon D1 (2.00 g, 10.2 mmol) and γ-BL (8.45 g) were added and reacted at 40° C. for 6 hours, to obtain a polyamic acid solution (5) wherein $C_R$ was 20 mass %. Of this polyamic acid, Mn was 11,600, and Mw was 39,800.

Synthesis Example 6

D3 (3.50 g, 15.6 mmol), A2 (2.50 g, 6.34 mmol), B1 (0.96 g, 6.31 mmol) and B2 (0.84 g, 3.18 mmol) were mixed in NMP (23.4 g), and reacted at 40° C. for 12 hours, to obtain a polyamic acid solution wherein $C_R$ was 25 mass %.

The obtained polyamic acid solution (30.0 g) was diluted to 6 mass % by adding NMP, and then, as an imidation catalyst, acetic anhydride (3.80 g) and pyridine (2.50 g) were added, followed by a reaction at 60° C. for 2 hours. This reaction solution was poured into methanol (450 ml), and the resulting precipitate was collected by filtration. This precipitate was washed with methanol, and dried at 100° C. under reduced pressure to obtain a polyimide powder (6). Of this polyimide, the imidization ratio was 58%, Mn was 17,200, and Mw was 47,500.

Synthesis Example 7

D3 (2.00 g, 8.92 mmol), A4 (1.34 g, 2.72 mmol), B1 (0.28 g, 1.84 mmol) and B2 (1.19 g, 4.50 mmol) were mixed in γ-BL (27.2 g), and reacted at 40° C. for 12 hours, to obtain a polyamic acid solution (7) wherein $C_R$ was 15 mass %. Of this polyamic acid, Mn was 10,500, and Mw was 37,500.

Synthesis Example 8

D2 (1.87 g, 7.47 mmol), A5 (2.85 g, 7.57 mmol) and C1 (1.23 g, 11.4 mmol) were mixed in NMP (16.3 g), and reacted at 80° C. for 5 hours, whereupon D1 (2.20 g, 11.2 mmol) and NMP (8.15 g) were added and reacted at 40° C. for 6 hours, to obtain polyamic acid solution (8) wherein $C_R$ was 25 mass %. Of this polyamic acid, Mn was 17,500, and Mw was 60, 200.

Synthesis Example 9

D2 (2.38 g, 9.51 mmol) and C1 (2.61 g, 24.1 mmol) were mixed in NMP (15.6 g), and reacted at 40° C. for 2 hours, whereupon D1 (2.80 g, 14.3 mmol) and NMP (7.80 g) were added and reacted at 25° C. for 6 hours, to obtain a polyamic acid solution (9) wherein $C_R$ was 25 mass %. Of this polyamic acid, Mn was 25,800, and Mw was 73,500.

The polyimide type polymers obtained in the above respective Synthesis Examples are shown in Table 1. Here, *1 in the Table represents the polyamic acid.

(4.10 g), E3 (7.45 g) and E5 (32.5 g) were mixed, to prepare a solution of an alkoxy silane monomer. To this solution, a solution which had previously been prepared by mixing ECS (14.2 g), water (10.8 g) and oxalic acid (0.70 g) as a catalyst, was dropwise added at 25° C. over 30 minutes and further stirred at 25° C. for 30 minutes. Thereafter, the mixture was refluxed for 30 minutes by heating by means of an oil bath, and then, a previously-prepared mixed solution of a methanol solution (1.20 g) having E4 content of 92 mass %, and ECS (0.90 g), was added. After refluxing for further 30 minutes, the mixture was left to cool to obtain a polysiloxane solution (1) having a $SiO_2$-converted concentration of 12 mass %.

Synthesis Example 11

In a four-necked reaction flask of 200 ml equipped with a thermometer and a reflux condenser, EC (29.2 g), E1 (4.10 g) and E5 (38.8 g) were mixed, to prepare a solution of an alkoxysilane monomer. To this solution, a solution which had previously been prepared by mixing EC (14.6 g), water (10.8 g), and oxalic acid (0.50 g) as a catalyst, was dropwise added at 25° C. over 30 minutes, and further stirred at 25° C. for 30 minutes. Thereafter, the mixture was refluxed for 30 minutes by heating by means of an oil bath, and then, a previously-prepared mixed solution of a methanol solution (1.20 g) having a E4 content of 92 mass % and EC (0.90 g), was added. After further refluxing for 30 minutes, the mixture was left to cool to obtain a polysiloxane solution (2) having a $SiO_2$-converted concentration of 12 mass %.

Synthesis Example 12

In a four-necked reaction flask of 200 ml equipped with a thermometer and a reflux condenser, ECS (28.3 g), E2 (4.07 g), E3 (7.45 g) and E5 (32.5 g) were mixed to prepare a solution of an alkoxy silane monomer. To this solution, a

TABLE 1

| Synthesis Example | Polymer | Tetracarboxylic acid component | Diamine component | | | Imidization ratio (%) |
| | | | Specific side chain type diamine | Second diamine | Other diamine | |
|---|---|---|---|---|---|---|
| 1 | Polyamic acid solution (1) | D1 (4.50 g, 22.9 mmol), D2 (3.83 g, 15.3 mmol) | A1 (5.90 g, 15.5 mmol) | — | C1 (2.51 g, 23.2 mmol) | *1 |
| 2 | Polyimide powder (2) | D1 (4.50 g, 22.9 mmol), D2 (3.83 g, 15.3 mmol) | A1 (5.90 g, 15.5 mmol) | — | C1 (2.51 g, 23.2 mmol) | 55 |
| 3 | Polyamic acid solution (3) | D1 (1.80 g, 9.18 mmol), D2 (1.53 g, 6.12 mmol) | A1 (2.36 g, 6.20 mmol) | B2 (2.05 g, 7.76 mmol) | C1 (0.17 g, 1.57 mmol) | *1 |
| 4 | Polyamic acid solution (4) | D1 (1.50 g, 7.65 mmol), D4 (1.01 g, 5.10 mmol) | A2 (2.04 g, 5.17 mmol) | B1 (0.20 g, 1.31 mmol), B2 (1.71 g, 6.47 mmol) | — | *1 |
| 5 | Polyamic acid solution (5) | D1 (2.00 g, 10.2 mmol), D4 (0.51 g, 2.57 mmol) | A3 (1.68 g, 3.88 mmol) | B1 (0.79 g, 5.19 mmol), B3 (1.37 g, 3.87 mmol) | — | *1 |
| 6 | Polyimide powder (6) | D3 (3.50 g, 15.6 mmol) | A2 (2.50 g, 6.34 mmol) | B1 (0.96 g, 6.31 mmol), B2 (0.84 g, 3.18 mmol) | — | 58 |
| 7 | Polyamic acid solution (7) | D3 (2.00 g, 8.92 mmol) | A4 (1.34 g, 2.72 mmol) | B1 (0.28 g, 1.84 mmol), B2 (1.19 g, 4.50 mmol) | — | *1 |
| 8 | Polyamic acid solution (8) | D1 (2.20 g, 11.2 mmol), D2 (1.87 g, 7.47 mmol) | A5 (2.85 g, 7.57 mmol) | — | C1 (1.23 g, 11.4 mmol) | *1 |
| 9 | Polyamic acid solution (9) | D1 (2.80 g, 14.3 mmol), D2 (2.38 g, 9.51 mmol) | — | — | C1 (2.61 g, 24.1 mmol) | *1 |

Synthesis of Polysiloxane Type Polymer

Synthesis Example 10

In a four-necked reaction flask of 200 ml equipped with a thermometer and a reflux condenser, ECS (28.3 g), E1 solution which had previously been prepared by mixing ECS (14.2 g), water (10.8 g) and oxalic acid (0.70 g) as a catalyst, was dropwise added at 25° C. over 30 minutes and further stirred at 25° C. for 30 minutes. Thereafter, the mixture was refluxed for 30 minutes by heating by means of an oil bath, and then, a previously-prepared mixed solution of a methanol solution (1.20 g) having a E4 content of 92 mass % and ECS (0.90 g), was added. After further refluxing for 30 minutes, the mixture was left to cool to obtain a polysiloxane solution (3) having a $SiO_2$-converted concentration of 12 mass %.

The polysiloxane type polymers obtained in Synthesis Examples are shown in Table 2.

TABLE 2

| Synthesis Example | Polymer | Alkoxysilane component | | |
|---|---|---|---|---|
| | | Alkoxysilane monomer of the formula [A1] | Alkoxysilane monomer of the formula [A2] | Alkoxysilane monomer of the formula [A3] |
| 10 | Polysiloxane solution (1) | E1(4.10 g) | E3(7.45 g), E4(1.10 g) | E5(32.5 g) |
| 11 | Polysiloxane solution (2) | E1(4.10 g) | E4(1.10 g) | E5(38.8 g) |
| 12 | Polysiloxane solution (3) | E2(4.07 g) | E3(7.45 g), E4(1.10 g) | E5(32.5 g) |

"Liquid Crystal Alignment Treating Agent"

Synthesis Example 13

To the polyamic acid solution (1) (10.0 g) obtained in Synthesis Example 1, NMP (25.5 g) was added, followed by stirring at 25° C. for 1 hour. Thereafter, BCS (27.0 g) was added, followed by stirring at 25° C. for 4 hours to obtain a liquid crystal alignment treating agent (1).

Synthesis Example 14

To the polyimide powder (2) (2.55 g) obtained in Synthesis Example 2, NMP (36.7 g) was added, followed by stirring at 70° C. for 24 hours for dissolution. Thereafter, PB (24.5 g) was added, followed by stirring at 25° C. for 4 hours to obtain a liquid crystal alignment treating agent (2).

Synthesis Example 15

To the polyamic acid solution (3) (10.5 g) obtained in Synthesis Example 3, NMP (26.8 g) was added, followed by stirring at 25° C. for 1 hour. Thereafter, BCS (28.4 g) was added, followed by stirring at 25° C. for 4 hours to obtain a liquid crystal alignment treating agent (3).

Synthesis Example 16

To the polyamic acid solution (4) (10.0 g) obtained in Synthesis Example 4, γ-BL (1.70 g) and PGME (55.0 g) were added, followed by stirring at 25° C. for 6 hours to obtain a liquid crystal alignment treating agent (4).

Synthesis Example 17

To the polyamic acid solution (4) (10.0 g) obtained in Synthesis Example 4, γ-BL (1.70 g) and PGME (55.0 g) were added, followed by stirring at 25° C. for 2 hours. Then, Q1 (0.14 g) was added, followed by stirring at 25° C. for 4 hours to obtain a liquid crystal alignment treating agent (5).

Synthesis Example 18

To the polyamic acid solution (4) (10.0 g) obtained in Synthesis Example 4, γ-BL (1.70 g) and PGME (55.0 g) were added, followed by stirring at 25° C. for 2 hours. Then, K1 (0.14 g) was added, followed by stirring at 25° C. for 4 hours, to obtain a liquid crystal alignment treating agent (6).

Synthesis Example 19

To the polyamic acid solution (4) (10.0 g) obtained in Synthesis Example 4, γ-BL (1.70 g) and PGME (55.0 g) were added, followed by stirring at 25° C. for 2 hours. Thereafter, Q1 (0.14 g) and K1 (0.14 g) were added, followed by stirring at 25° C. for 4 hours to obtain a liquid crystal alignment treating agent (7).

Synthesis Example 20

To the polyamic acid solution (5) (10.0 g) obtained in Synthesis Example 5, γ-BL (4.93 g), PB (6.47 g) and PGME (45.3 g) were added, followed by stirring at 25° C. for 2 hours. Thereafter, Q1 (0.14 g), K2 (0.06 g) and N1 (0.04 g) were added, followed by stirring at 25° C. for 4 hours to obtain a liquid crystal alignment treating agent (8).

Synthesis Example 21

To the polyimide powder (6) (2.50 g) obtained in Synthesis Example 6, NMP (33.0 g) was added, followed by stirring at 70° C. for 24 hours for dissolution. Thereafter, Q1 (0.25 g), K1 (0.125 g), M1 (0.075 g) and PB (27.0 g) were added, followed by stirring at 25° C. for 4 hours, to obtain a liquid crystal alignment treating agent (9).

Synthesis Example 22

To the polyamic acid solution (7) (15.0 g) obtained in Synthesis Example 7, γ-BL (9.08 g) and PGME (50.9 g) were added, followed by stirring at 25° C. for 2 hours. Thereafter, Q1 (0.113 g), K2 (0.158 g), N1 (0.045 g) and M2 (0.113 g) were added, followed by stirring at 25° C. for 4 hours to obtain a liquid crystal alignment treating agent (10).

Synthesis Example 23

To the polyamic acid solution (8) (10.0 g) obtained in Synthesis Example 8, NMP (25.5 g) was added, followed by stirring at 25° C. for 1 hour. Thereafter, BCS (27.0 g) was added, followed by stirring at 25° C. for 4 hours to obtain a liquid crystal alignment treating agent (11).

Synthesis Example 24

To the polyamic acid solution (9) (10.0 g) obtained in Synthesis Example 9, NMP (25.5 g) was added, followed by stirring at 25° C. for 1 hour. Thereafter, BCS (27.0 g) was added, followed by stirring at 25° C. for 4 hours to obtain a liquid crystal alignment treating agent (12).

Synthesis Example 25

To the polysiloxane solution (1) (10.0 g) obtained in Synthesis Example 10, ECS (17.7 g) and PGME (6.62 g) were added, followed by stirring at 25° C. for 6 hours, to obtain a liquid crystal alignment treating agent (13).

Synthesis Example 26

To the polysiloxane solution (2) (10.0 g) obtained in Synthesis Example 11, EC (1.13 g), PB (13.2 g) and PGME (9.93 g) were added, followed by stirring at 25° C. for 2 hours. Thereafter, Q1 (0.06 g) was added, followed by stirring at 25° C. for 4 hours, to obtain a liquid crystal alignment treating agent (14).

Synthesis Example 27

To the polysiloxane solution (3) (10.0 g) obtained in Synthesis Example 12, ECS (17.7 g) and PGME (6.62 g) were added, followed by stirring at 25° C. for 6 hours, to obtain a liquid crystal alignment treating agent (15).

The liquid crystal alignment treating agents obtained in the above Synthesis Examples are shown in Tables 3 and 4. In each of the liquid crystal alignment treating agents obtained in these Synthesis Examples, abnormalities such as turbidity, precipitation, etc. were not observed, and each agent was confirmed to be a homogeneous solution.

Here, in Table 3 and Table 4, the numerical values in parentheses for the specific compound (A), the specific crosslinkable compound, the specific generator and the specific adhesion compound, to be added to the liquid crystal alignment treating agents, represent the contents (parts by mass) to 100 parts by mass of the respective specific polymers.

TABLE 3

| Synthesis Example | Liquid crystal alignment treating agent | Specific polymer | Polymer | Specific compound (A) | Specific crosslinkable compound | Specific generator | Specific adhesion compound |
|---|---|---|---|---|---|---|---|
| 13 | (1) | Polyamic acid solution (1) | — | — | — | — | — |
| 14 | (2) | Polyimide powder (2) | — | — | — | — | — |
| 15 | (3) | Polyamic acid solution (3) | — | — | — | — | — |
| 16 | (4) | Polyamic acid solution (4) | — | — | — | — | — |
| 17 | (5) | Polyamic acid solution (4) | — | Q1 (7) | — | — | — |
| 18 | (6) | Polyamic acid solution (4) | — | — | K1 (7) | — | — |
| 19 | (7) | Polyamic acid solution (4) | — | Q1 (7) | K1 (7) | — | — |
| 20 | (8) | Polyamic acid solution (5) | — | Q1 (7) | K2 (3) | N1 (2) | — |
| 21 | (9) | Polyimide powder (6) | — | Q1 (10) | K1 (5) | — | M1 (3) |
| 22 | (10) | Polyamic acid solution (7) | — | Q1 (5) | K2 (7) | N1 (2) | M2 (5) |

TABLE 4

| Synthesis Example | Liquid crystal alignment treating agent | Specific polymer | Polymer | Specific compound (A) | Specific crosslinkable compound | Specific generator | Specific adhesion compound |
|---|---|---|---|---|---|---|---|
| 23 | (11) | Polyamic acid solution (8) | — | — | — | — | — |
| 24 | (12) | — | Polyamic acid solution (9) | — | — | — | — |
| 25 | (13) | Polysiloxane solution (1) | — | — | — | — | — |
| 26 | (14) | Polysiloxane solution (2) | — | Q1 (5) | — | — | — |
| 27 | (15) | Polysiloxane solution (3) | — | — | — | — | — |

"Preparation of Liquid Crystal Composition"

Liquid Crystal Composition (1)

Loctite 3736 (manufactured by Henkel) (a curable resin and a monomer having at least one type of polar group selected from the group consisting of a hydroxy group and a phosphoric acid group in the present invention; a liquid comprising, based on the entire amount of the liquid, an aliphatic urethane acrylate: 38 mass %, an isobornyl acrylate: 36 mass %, an acrylate ester: 9 mass %, hydroxyethyl methacrylate: 9 mass %, a polymerization initiator: 5 mass %, and an organophosphoric acid compound: 3 mass %) (1.20 g) (1,9-nonanediol dimethacrylate (a bifunctional monomer in the present invention) (1.10 g) and 1,4-bis(3-mercaptobutyryloxy) butane (0.15 g), were mixed. Then, liquid crystal (MLC-6608) (manufactured by Merck) (2.75 g), T1 (0.187 g) and S1 (0.187 g) were mixed, to obtain a liquid crystal composition (1).

Liquid Crystal Composition (2)

Said Loctite 3736 (1.20 g), 1,9-nonanediol dimethacrylate (1.10 g) and 1,4-bis(3-mercaptobutyryloxy) butane (0.15 g) were mixed. Thereafter, said liquid crystal (MLC-6608) (2.94 g), T2 (0.187 g) and S1 (0.374 g) were mixed, to obtain a liquid crystal composition (2).

Liquid Crystal Composition (3)

Said Loctite 3736 (1.20 g), 1,9-nonanediol dimethacrylate (1.10 g) and 1,4-bis(3-mercaptobutyryloxy) butane (0.15 g) were mixed. Thereafter, said liquid crystal (MLC-6608) (2.94 g), T1 (0.187 g), S1 (0.187 g) and W1 (0.187 g) were mixed, to obtain a liquid crystal composition (3).

Liquid Crystal Composition (4)

Said Loctite 3736 (1.20 g), 1,9-nonanediol dimethacrylate (1.10 g) and 1,4-bis(3-mercaptobutyryloxy) butane (0.15 g) were mixed. Thereafter, said liquid crystal (MLC-6608) (3.12 g), T1 (0.187 g), S1 (0.374 g) and W1 (0.187 g) were mixed, to obtain a liquid crystal composition (4).

Liquid Crystal Composition (5)

Said Loctite 3736 (1.20 g), 1,9-nonanediol dimethacrylate (1.10 g) and 1,4-bis(3-mercaptobutyryloxy) butane (0.15 g)

were mixed. Thereafter, said liquid crystal (MLC-6608) (2.38 g) was mixed to obtain a liquid crystal composition (5).

Preparation of Liquid Crystal Composition (6)

Said Loctite 3736 (1.20 g), 1,9-nonanediol dimethacrylate (1.10 g) and 1,4-bis(3-mercaptobutyryloxy) butane (0.15 g) were mixed. Thereafter, liquid crystal (MLC-6608) (2.56 g) and T1 (0.187 g) were mixed, to obtain a liquid crystal composition (6).

Preparation of Liquid Crystal Composition (7)

Said Loctite 3736 (1.20 g), 1,9-nonanediol dimethacrylate (1.10 g) and 1,4-bis(3-mercaptobutyryloxy) butane (0.15 g) were mixed. Thereafter, liquid crystal (MLC-6608) (2.56 g) and S1 (0.187 g) were mixed, to obtain a liquid crystal composition (7).

"Preparation of Liquid Crystal Display Device, and Evaluation of Liquid Crystal Alignment Property (Glass Substrates)"

A liquid crystal alignment treating agent obtained in Synthesis Example was pressure-filtered through a membrane filter with a pore size of 1 µm. The obtained solution was spin-coated on the ITO surface of an ITO electrode-attached glass substrate (length: 100 mm, horizontal: 100 mm, thickness: 0.7 mm) washed with pure water and IPA (isopropyl alcohol), followed by heat treatment at 100° C. for 5 minutes on a hot plate and at 210° C. for 30 minutes in a heat circulating clean oven, to obtain an ITO substrate provided with a liquid crystal alignment film with a film thickness of 100 nm. Two such liquid crystal alignment film-attached ITO substrates were prepared, and on the liquid crystal alignment film surface of one substrate, a spacer with a particle size of 6 µm was applied. Thereafter, on the liquid crystal alignment film surface of the substrate coated with the spacer, the above-mentioned liquid crystal composition was dropped by a ODF (One Drop Filling) method, and then, the other substrate was bonded so that the liquid crystal alignment films faced each other, to obtain a liquid crystal display device before treatment.

This liquid crystal display device before treatment was subjected to ultraviolet light irradiation for an irradiation time of 30 seconds by means of a metal halide lamp with an illuminance of 20 mW/cm² by cutting wavelengths below 350 nm. At that time, the temperature in the irradiation apparatus when irradiating the liquid crystal cell with ultraviolet light was controlled to be 25° C. Further, in Example 2, ultraviolet light irradiation was carried out by using an ultraviolet light-emitting diode. Specifically, the wavelength of the light source of the ultraviolet light-emitting diode was 365 nm, the illuminance of ultraviolet light was 15 mW/cm², the irradiation time was 60 seconds, and further, irradiation was performed by controlling the temperature of the substrate surface to be 20° C. Thus, a liquid crystal display device (reverse type device) (glass substrates) was obtained.

Using this liquid crystal display device, the liquid crystal alignment property was evaluated. For the liquid crystal alignment property, the device was observed by a polarizing microscope (ECLIPSE E600WPOL) (manufactured by Nikon Corporation) to confirm whether or not the liquid crystal is aligned vertically. As a result, in the liquid crystal display devices in Examples and Comparative Examples 2 to 4, the liquid crystal was aligned vertically. In contrast, in the liquid crystal display device in Comparative Example 1, the liquid crystal was not aligned vertically.

"Preparation of Liquid Crystal Display Device and Evaluation of Liquid Crystal Alignment Property (Plastic Substrates)"

A liquid crystal alignment treating agent obtained in Synthesis Example was pressure-filtered through a membrane filter with a pore size of 1 µm. The obtained solution was applied on the ITO surface of an ITO electrode-attached PET (polyethylene terephthalate) substrate (length: 150 mm, horizontal: 150 mm, thickness: 0.2 mm) washed with pure water, by a bar coater, followed by heat treatment at 120° C. for 2 minutes by a heat circulation type clean oven, to obtain an ITO substrate provided with a liquid crystal alignment film with a film thickness of 100 nm. Two such liquid crystal alignment film-attached ITO substrates were prepared, and the liquid crystal alignment film surface of one substrate, was coated with a spacer of 6 µm. Thereafter, on the liquid crystal alignment film surface of the substrate coated with the spacer, the above-mentioned liquid crystal composition was dropped by an ODF method, and then the other substrate was bonded so that the liquid crystal alignment films faced each other, to obtain a liquid crystal display device before treatment.

This liquid crystal display device before pretreatment was subjected to ultraviolet light irradiation for an irradiation time of 30 seconds by means of a metal halide lamp with an illuminance of 20 mW/cm², by cutting wavelengths below 350 nm. At that time, the temperature in the irradiation apparatus when irradiating the liquid crystal cell with ultraviolet light was controlled to be 25° C. Further, in Examples 6, 11, 13, 15 and 18, ultraviolet light irradiation was conducted by using an ultraviolet light-emitting diode. Specifically, the wavelength of the light source of the ultraviolet light-emitting diode was 365 nm, the illuminance of ultraviolet light was 15 mW/cm², the irradiation time was 60 seconds, and further, irradiation was performed by controlling the temperature of the substrate surface to be 20° C. Thus, a liquid crystal display device (reverse type) (plastic substrates) was obtained.

Using this liquid crystal display device, the liquid crystal alignment property was evaluated. For the liquid crystal alignment property, the device was observed by a polarizing microscope (ECLIPSE E600WPOL) (manufactured by Nikon Corporation) to confirm whether or not the liquid crystal was aligned vertically. As a result, in the liquid crystal display devices in Examples of the present invention, the liquid crystal was aligned vertically.

"Evaluation of Optical Properties (Transparency and Scattering Properties)"

Evaluation of transparency was carried out by measuring the haze (HAZE (%)) of the liquid crystal display device (glass substrates or plastic substrates) in a state where no voltage was applied. Specifically, measurement of HAZE (%) was conducted by using a spectroscopic haze meter (TC-1800H, manufactured by Tokyo Denshoku Co., Ltd.) as the measuring apparatus. Evaluation was made on such a basis that one with a HAZE (%) being low, is excellent in transparency.

Evaluation of the scattering properties at the time when a voltage was applied, was conducted by applying 45 V by AC drive to a liquid crystal display device (glass substrates or plastic substrates), and by measuring the HAZE (%) under the same conditions as described above. Evaluation was made on such a basis that one with a HAZE (%) being high, is excellent in the scattering properties.

Further, as a stability test of a liquid crystal display device under a high-temperature and high-humidity environment, the HAZE (%) was measured when no voltage was applied and when a voltage was applied, after storage for 36 hours in a constant temperature and constant humidity vessel at a temperature of 80° C. under a humidity of 90% RH. Specifically, one with a change ratio of HAZE (%) after the storage in the constant temperature and constant humidity vessel to HAZE (%) (initial value) immediately after production of the liquid crystal display device, being low, was regarded as being excellent in the evaluation. At that time, in Examples 1, 4, 5, 7 to 10, 12, 16, 17 and 20, in addition to the standard test as described above, as a stressed test, evaluation of HAZE (%) after storage for 72 hours in a constant temperature and constant humidity vessel at a temperature of 80° C. under a humidity of 90% RH, was also conducted. The evaluation method was under the same conditions as described above.

Further, as a stability test of a liquid crystal display device against irradiation with light, using a tabletop UV curing apparatus (HCT3B28HEX-1) (manufactured by Sen Lights Corporation), the HAZE (%) was measured when no voltage was applied and when a voltage was applied after irradiation with ultraviolet light of 5 J/cm$^2$ with 365 nm. Specifically, one with a change ratio of HAZE (%) after irradiation with ultraviolet light to HAZE (%) (initial value) immediately after production of the liquid crystal display device, being low, was regarded as being excellent in the evaluation.

The evaluation results of HAZE (%), when no voltage was applied and when a voltage was applied, immediately after preparation of the liquid crystal display device (Initial), after storage in the constant temperature and constant humidity vessel (Constant temperature and humidity) and after irradiation with ultraviolet light (Ultraviolet light), are summarized in Tables 5 to 7.

"Evaluation of Adhesion Between Liquid Crystal Layer and Liquid Crystal Alignment Film"

This evaluation was carried out to confirm the presence or absence of air bubbles in the liquid crystal display device and the peeling of the device (as a stability test of the liquid crystal display device in a high-temperature and high-humidity environment) by storing the liquid crystal display device (glass substrates or plastic substrates) in a constant temperature and constant humidity vessel at a temperature of 80° C. under a humidity of 90% RH for 36 hours. Specifically, one wherein no air bubbles were observed in the device and no peeling of the device (no such a state that the liquid crystal layer and the liquid crystal alignment film are peeled) occurred, was regarded as being excellent in this evaluation (represented by "Good" in Tables). At that time, in Examples 1, 4, 5, 7 to 10, 12, 16, 17 and 20, in addition to the standard test as described above, as a stressed test, evaluation of adhesion after storage for 72 hours in a constant temperature and constant humidity vessel at a temperature of 80° C. under a humidity of 90% RH was also carried out. Here, the evaluation method was under the same conditions as described above.

Further, the presence or absence of air bubbles in the liquid crystal display device and peeling of the device after irradiating the liquid crystal display device with ultraviolet light of 5 J/cm$^2$ at 365 nm by means of a tabletop UV curing device (HCT3B28HEX-1) (manufactured by Sen Lights Corporation), were also confirmed (as a stability test of the liquid crystal display device against irradiation with light). Specifically, one wherein no air bubbles were observed in the device and no peeling of the device occurred, was regarded as being excellent in this evaluation (represented by "Good" in Tables).

The results (Adhesion) of adhesion between the liquid crystal layer and the liquid crystal alignment film after storage in the constant temperature and constant humidity vessel (Constant temperature and humidity) and after irradiation with ultraviolet light (Ultraviolet light), are summarized in Tables 8 to 10.

Examples 1 to 20 and Comparative Examples 1 to 7

As shown in the following Tables 5 to 10, by using one of the liquid crystal alignment treating agents (1) to (15) and one of the liquid crystal compositions (1) to (7), obtained respectively in the above Synthesis Examples, evaluation of the optical properties (transparency and scattering properties), and evaluation of the adhesion between the liquid crystal layer and the liquid crystal alignment film were conducted.

Here, in Examples 1 to 4, 14, 16, 19 and Comparative Examples 1 to 4, liquid crystal display devices were prepared by using glass substrates, and the respective evaluations were conducted, while in Examples 5 to 13, 15, 17, 18, 20 and Comparative Examples 5 to 7, liquid crystal display devices were prepared by using plastic substrates, and the respective evaluations were conducted. Further, in Examples 1, 3 to 5, 7 to 10, 12, 14, 16, 17, 19, 20 and Comparative Examples 1 to 7, liquid crystal display devices were prepared by using a metal halide lamp as the light source of the ultraviolet irradiation apparatus, and the respective evaluations were conducted, while in Examples 2, 6, 11, 13, 15 and 18, liquid crystal display devices were prepared by using an ultraviolet light emitting diode as the light source, and the respective evaluations were conducted. These results are summarized in Tables 5 to 10.

Further, in the evaluation of the optical properties (transparency) and the evaluation of the adhesion between the liquid crystal layer and the liquid crystal alignment film in Examples 1, 4, 5, 7 to 10, 12, 16, 17 and 20, in addition to the above standard test, as a stressed test, evaluation at the time when stored in a constant temperature and constant humidity vessel at a temperature of 80° C. for 72 hours under a humidity of 90% RH, was also conducted (other conditions were the same as the above conditions). Here, In Examples 10 and 12, no air bubbles were observed in the device, but in Examples 7 to 9, a very small amount of air bubbles was observed in the device, in Examples 4 and 5, a small amount of air bubbles was observed in the device, in Examples 1 and 17, air bubbles were observed in the device, and in Examples 16 and 20, many air bubbles were observed in the device.

TABLE 5

| Example | Liquid crystal alignment treating agent | Liquid crystal composition | Optical properties (Haze (%)) | | | | | |
|---|---|---|---|---|---|---|---|---|
| | | | Transparency | | | Scattering properties | | |
| | | | Initial | Constant temperature and humidity (standard test/stressed test) | Ultraviolet light | Initial | Constant temperature and humidity (standard test/stressed test) | Ultraviolet light |
| 1 | (1) | (1) | 16.9 | 18.9/21.1 | 17.6 | 85.1 | 86.0/87.0 | 85.4 |
| 2 | (1) | (1) | 16.1 | 17.9 | 16.8 | 86.8 | 87.8 | 87.1 |
| 3 | (2) | (2) | 16.1 | 17.6 | 16.6 | 86.9 | 87.7 | 87.2 |
| 4 | (3) | (1) | 14.4 | 15.4/16.5 | 14.7 | 88.6 | 89.2/89.8 | 88.8 |
| 5 | (4) | (1) | 14.3 | 15.3/16.3 | 14.6 | 88.7 | 89.3/89.9 | 88.9 |
| 6 | (4) | (1) | 13.0 | 13.9 | 13.3 | 90.5 | 91.1 | 90.7 |
| 7 | (5) | (1) | 13.6 | 14.6/15.6 | 13.9 | 89.4 | 90.0/90.7 | 89.6 |
| 8 | (6) | (1) | 12.8 | 13.5/14.1 | 13.1 | 90.2 | 90.7/91.1 | 90.4 |
| 9 | (7) | (1) | 11.7 | 12.3/12.9 | 11.9 | 91.2 | 91.7/92.1 | 91.4 |
| 10 | (7) | (3) | 10.7 | 11.3/11.8 | 10.9 | 91.4 | 91.9/92.3 | 91.6 |

TABLE 6

| Example | Liquid crystal alignment treating agent | Liquid crystal composition | Optical properties (Haze (%)) | | | | | |
|---|---|---|---|---|---|---|---|---|
| | | | Transparency | | | Scattering properties | | |
| | | | Initial | Constant temperature and humidity (standard test/stressed test) | Ultraviolet light | Initial | Constant temperature and humidity (standard test/stressed test) | Ultraviolet light |
| 11 | (7) | (3) | 10.2 | 10.7 | 10.4 | 92.3 | 92.8 | 92.5 |
| 12 | (7) | (4) | 10.6 | 11.2/11.7 | 10.7 | 91.3 | 91.8/92.2 | 91.4 |
| 13 | (8) | (2) | 13.2 | 14.0 | 13.5 | 89.8 | 90.3 | 90.0 |
| 14 | (9) | (1) | 11.7 | 12.4 | 12.0 | 91.2 | 91.7 | 91.4 |
| 15 | (10) | (3) | 11.1 | 11.7 | 11.3 | 91.9 | 92.4 | 92.1 |
| 16 | (11) | (1) | 20.3 | 22.3/25.6 | 20.7 | 84.4 | 85.5/86.6 | 84.9 |
| 17 | (13) | (1) | 17.1 | 19.0/21.1 | 17.8 | 85.6 | 86.5/87.5 | 85.9 |
| 18 | (13) | (4) | 10.8 | 11.4 | 11.0 | 91.4 | 91.9 | 91.6 |
| 19 | (14) | (2) | 16.0 | 17.5 | 16.5 | 87.2 | 88.0 | 87.5 |
| 20 | (15) | (1) | 21.9 | 23.5/26.7 | 21.9 | 84.6 | 85.7/86.5 | 85.5 |

TABLE 7

| Comparative Example | Liquid crystal alignment treating agent | Liquid crystal composition | Optical properties (Haze (%)) | | | | | |
|---|---|---|---|---|---|---|---|---|
| | | | Transparency | | | Scattering properties | | |
| | | | Initial | Constant temperature and humidity (standard test) | Ultraviolet light | Initial | Constant temperature and humidity (standard test) | Ultraviolet light |
| 1 | (12) | (1) | *1 | *1 | *1 | *1 | *1 | *1 |
| 2 | (1) | (5) | 36.4 | 42.9 | 40.0 | 78.6 | 80.0 | 79.4 |
| 3 | (1) | (6) | 31.5 | 37.0 | 34.6 | 81.7 | 83.2 | 82.5 |
| 4 | (1) | (7) | 31.6 | 34.6 | 33.7 | 82.3 | 83.1 | 82.9 |
| 5 | (4) | (5) | 36.9 | 43.6 | 40.6 | 80.4 | 81.8 | 81.2 |
| 6 | (4) | (6) | 31.4 | 36.4 | 34.3 | 83.2 | 84.8 | 84.6 |
| 7 | (4) | (7) | 32.1 | 35.2 | 34.7 | 83.1 | 84.6 | 84.1 |

TABLE 8

| Example | Liquid crystal alignment treating agent | Liquid crystal composition | Adhesion Constant temperature and humidity (standard test/ stressed test) | Ultraviolet light |
|---|---|---|---|---|
| 1 | (1) | (1) | Good/*4 | Good |
| 2 | (1) | (1) | Good/— | Good |
| 3 | (2) | (2) | Good/— | Good |
| 4 | (3) | (1) | Good/*3 | Good |
| 5 | (4) | (1) | Good/*3 | Good |
| 6 | (4) | (1) | Good/— | Good |
| 7 | (5) | (1) | Good/*2 | Good |
| 8 | (6) | (1) | Good/*2 | Good |
| 9 | (7) | (1) | Good/*2 | Good |
| 10 | (7) | (3) | Good/Good | Good |

TABLE 9

| Example | Liquid crystal alignment treating agent | Liquid crystal composition | Adhesion Constant temperature and humidity (standard test/ stressed test) | Ultraviolet light |
|---|---|---|---|---|
| 11 | (7) | (3) | Good/— | Good |
| 12 | (7) | (4) | Good/Good | Good |
| 13 | (8) | (2) | Good/— | Good |
| 14 | (9) | (1) | Good/— | Good |
| 15 | (10) | (3) | Good/— | Good |
| 16 | (11) | (1) | Good/*5 | Good |
| 17 | (13) | (1) | Good/*4 | Good |
| 18 | (13) | (4) | Good/— | Good |
| 19 | (14) | (2) | Good/— | Good |
| 20 | (15) | (1) | Good/*5 | Good |

TABLE 10

| Comparative Example | Liquid crystal alignment treating agent | Liquid crystal composition | Adhesion Constant temperature and humidity (standard test) | Ultraviolet light |
|---|---|---|---|---|
| 1 | (12) | (1) | *1 | *1 |
| 2 | (1) | (5) | *3 | *2 |
| 3 | (1) | (6) | *2 | Good |
| 4 | (1) | (7) | *3 | *2 |
| 5 | (4) | (5) | *3 | *2 |
| 6 | (4) | (6) | *2 | Good |
| 7 | (4) | (7) | *3 | *2 |

*1: Since liquid crystal was not aligned vertically, evaluation was impossible. *2: a very small amount of air bubbles was observed in the device. *3: a small amount of air bubbles were observed in the device (more than *2). *4: air bubbles were observed in the device (more than *3). *5: Many air bubbles were observed in the device (more than *4).

As seen above, the liquid crystal display devices in Examples, as compared with in Comparative Examples, were good in optical properties, i.e. in transparency at the initial stage, after storage in the constant temperature and constant humidity vessel, and after irradiation with ultraviolet light, and the adhesion between the liquid crystal layer and the liquid crystal alignment film was also high. In particular, even in the case where plastic substrates were used as the substrates of the liquid crystal display devices, these properties were good.

In particular, in Examples in which the specific compound (1) and the specific compound (2) were incorporated in the liquid crystal composition, as compared to in Comparative Examples in which they were not incorporated, or in which only either one of them was incorporated, the optical properties and the adhesion of the liquid crystal and the liquid crystal alignment film at the initial stage and under the harsh conditions became to be high. Specifically, in comparison under the same conditions, Example 1 is compared with Comparative Example 2, Comparative Example 3 or Comparative Example 4, and Example 5 is compared with Comparative Example 5, Comparative Example 6 or 7.

Further, in a Comparative Example in which no diamine having a specific side chain structure was used, liquid crystal was not aligned vertically. Specifically, Comparative Example 1 is mentioned.

In a case where in the liquid crystal composition, together with the specific compounds (1) and (2), the specific compound (3) was introduced, the optical properties, especially transparency became to be high. Specifically, in comparison under the same conditions, Examples 9 and 10 are compared.

In the case of using a diamine having a specific side chain structure of the above formula [4-1a] among the specific side chain structures in the specific polymer of the liquid crystal alignment treating agent, as compared with the case of using a diamine having the formula [4-2a], the optical properties, especially the transparency became to be high. Further, also after storage in the constant temperature and constant humidity vessel for a long time in a stressed test, the result of high transparency was obtained. Further, also in the evaluation of adhesion between the liquid crystal layer and the liquid crystal alignment film, in the case of using the diamine of the formula [4-1a], the result of high adhesion was obtained even after storage in the constant temperature and constant humidity vessel for a long time in a stressed test. Specifically, in comparison under the same conditions, Examples 1 and 16 are compared, and Examples 17 and 20 are compared.

In the case of using the second diamine as the specific polymer of the liquid crystal alignment treating agent, adhesion between the liquid crystal layer and the liquid crystal alignment film became to be high, particularly under the above harsh conditions. Specifically, in comparison under the same conditions, Examples 1 and 4 are compared.

In a case where the specific compound (A) was introduced in the liquid crystal alignment agent, the optical properties, especially the transparency became to be high. Specifically, in comparison under the same conditions, Examples 5 and 7 are compared.

In a case where the specific crosslinkable compound was introduced in the liquid crystal alignment agent, adhesion between the liquid crystal layer and the liquid crystal alignment film became to be high particularly under the above harsh conditions. Specifically, in comparison under the same conditions, Examples 5 and 8 are compared.

In a case where an ultraviolet light emitting diode was used as the light source of the ultraviolet irradiation apparatus, as compared with the case of using a metal halide lamp as the light source, the optical properties, especially the transparency became to be high. Specifically, in comparison under the same conditions, Examples 1 and 2 are compared, Examples 5 and 6 are compared, and Examples 10 and 11 are compared.

INDUSTRIAL APPLICABILITY

The liquid crystal display device of the present invention is useful as a device to be used for transportation equipment such as automobiles, railways, aircrafts, etc., in particular, as an optical shutter device to be used in dimming windows, room mirrors, etc. Particularly, this device has, as compared with the conventional reverse-type device, high light intake efficiency at nighttime, and further, it is possible to make the effect of preventing glare from external light to be high, whereby driving safety of a vehicle and riding comfort can be further improved, and the reliability is high.

Further, this device can also be used as a light guide plate of a display such as LCD (Liquid Crystal Display) or OLED (Organic Light-emitting Diode), or as a back plate of such a display. Specifically, in the case of a back plate of a transparent display, for example, when performing a screen display on the transparent display by combining the transparent display and this device, it is possible to use this device to suppress the entry of light from the back by this device. At that time, this device becomes a voltage applied scattering state when a screen display is performed on the transparent display, so that the screen display can be clearly made, and after completion of the screen display, it becomes a non-voltage applied transparent state.

The entire disclosure of Japanese Patent Application No. 2016-036258 filed on Feb. 26, 2016 including specification, claims and summary is incorporated herein by reference in its entirety.

The invention claimed is:

1. A liquid crystal display device having a liquid crystal layer made of comprising a cured product formed by irradiating a liquid crystal composition disposed between a pair of substrates provided with electrodes with ultraviolet light from an ultraviolet irradiation apparatus and at least one of the substrates being provided with a liquid crystal alignment film to vertically align liquid crystal, wherein the liquid crystal composition comprises a curable resin, a bifunctional monomer, a compound of the following formula [1-1a], a compound of the following formula [2-1a] and a monomer having at least one polar group selected from the group consisting of a hydroxy group, a carboxy group and a phosphoric acid group, and the liquid crystal alignment film is a liquid crystal alignment film obtained from a liquid crystal alignment treating agent comprising a polymer having a side chain structure of the following formula [4-1a] or formula [4-2a],

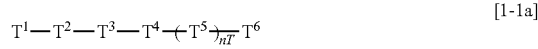

[1-1a]

wherein $T^1$ is a structure selected from the following formula [1-a] to formula [1-e], $T^2$ is a single bond or a $C_{1-24}$ alkylene group, provided that an optional —CH$_2$—in said alkylene group may be substituted by —O—, —CO—, —COO—, —OCO—, —CONH—, —NHCO—, —NH—, —CON(CH$_3$)—, —S— or —SO$_2$—, $T^3$ is a cyclic group having a benzene ring, a cyclohexane ring or a heterocyclic ring, or a $C_{17-51}$ bivalent organic group having a steroid skeleton, provided that an optional hydrogen atom on said cyclic group may be substituted by a $C_{1-3}$ alkyl group, a $C_{1-3}$ alkoxy group, a $C_{1-3}$ fluorine-containing alkyl group, a $C_{1-3}$ fluorine-containing alkoxy group or a fluorine atom, $T^4$ is a single bond, —O—, —OCH$_2$—, —CH$_2$O—, —COO— or —OCO—, $T^5$ is a cyclic group having a benzene ring, a cyclohexane ring or a heterocyclic ring, provided that an optional hydrogen atom on such a cyclic group may be substituted by a $C_{1-3}$ alkyl group, a $C_{1-3}$ alkoxy group, a $C_{1-3}$ fluorine-containing alkyl group, a $C_{1-3}$ fluorine-containing alkoxy group or a fluorine atom, $T^6$ is a $C_{1-18}$ alkyl group, a $C_{2-18}$ alkenyl group, a $C_{1-18}$ fluorine-containing alkyl group, a $C_{1-18}$ alkoxy group or a $C_{1-18}$ fluorine-containing alkoxy group, and nT is an integer of from 0 to 4,

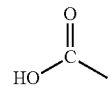

[1-a]

[1-b]

[1-c]

[1-d]

[1-e]

wherein $T^A$ is a $C_{1-5}$ alkyl group,

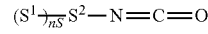

[2-1a]

wherein $S^1$ is at least one selected from the group consisting of the following formula [2-a] to formula [2-e], $S^2$ is a $C_{2-18}$ linear or branched alkylene group, provided that an optional —CH$_2$— in said alkylene group not adjacent to $S^1$ and —N═C═O may be substituted by —O—, —CO—, —COO—, —OCO—, —CONH—, —NHCO— or —NH—, and nS is an integer of from 1 to 4,

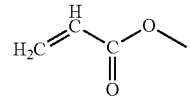

[2-a]

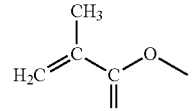

[2-b]

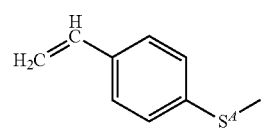

[2-c]

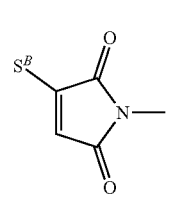

[2-d]

-continued

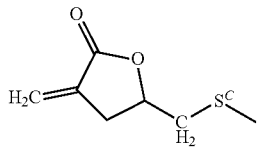
[2-e]

wherein $S^A$ and $S^C$ are each a single bond, —O—, —CH$_2$O—, —COO—, —COO—, —CONH—, —NHCO— or —NH—, and $S^R$ is a hydrogen atom or a benzene ring,

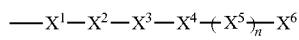
[4-1a]

wherein $X^1$ and $X^3$ are each a single bond, —(CH$_2$)$_a$— where a is an integer of from 1 to 15, —O—, —CH$_2$O—, —COO— or —OCO—, $X^2$ is a single bond or —(CH$_2$)$_b$— where b is an integer of from 1 to 15, $X^4$ is a cyclic group having a benzene ring, a cyclohexane ring or a heterocyclic ring, or a $C_{17-51}$ bivalent organic group having a steroid skeleton, provided that an optional hydrogen atom on said cyclic group may be substituted by a $C_{1-3}$ alkyl group, a $C_{1-3}$ alkoxy group, a $C_{1-3}$ fluorine-containing alkyl group, a $C_{1-3}$ fluorine-containing alkoxy group or a fluorine atom, $X^5$ is a cyclic group having a benzene ring, a cyclohexane ring or a heterocyclic ring, provided that an optional hydrogen atom on such a cyclic group, may be substituted by a $C_{1-3}$ alkyl group, a $C_{1-3}$ alkoxy group, a $C_{1-3}$ fluorine-containing alkyl group, a $C_{1-3}$ fluorine-containing alkoxy group or a fluorine atom, $X^6$ is a $C_{1-18}$ alkyl group, a $C_{2-18}$ alkenyl group, a $C_{1-18}$ fluorine-containing alkyl group, a $C_{1-18}$ fluorine-containing alkoxy group or a $C_{1-18}$ fluorine-containing alkoxy group, and n is an integer of from 0 to 4, —$X^7$—$X^8$
[4-2a]

wherein $X^7$ is a single bond, —O—, —CH$_2$O—, —CONH—, —NHCO—, —CON(CH$_3$)—, —N(CH$_3$)CO—, —COO— or —OCO—, and $X^8$ is a $C_{8-18}$ alkyl group or a $C_{6-18}$ fluorine-containing alkyl group.

2. The liquid crystal display device according to claim 1, wherein the compound of formula [1-1a] is the following formula [1-2a],

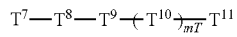
[1-2a]

wherein $T^7$ is the formula [1-b] or the formula [1-c], $T^8$ is a single bond or a $C_{1-8}$ alkylene group, $T^9$ and $T^{10}$ are each a benzene ring or a cyclohexane ring, $T^{11}$ is a $C_{1-12}$ alkyl group or alkoxy group, and mT is an integer of from 0 to 2.

3. The liquid crystal display device according to Claim 1, wherein the compound of formula [2-1a] is the following formula [2-2a],

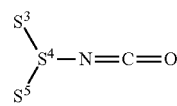
[2-2a]

wherein $S^3$ and $S^5$ are each the formula [2-a] or the formula [2-b], and $S^4$ is a $C_{2-8}$ linear or branched alkylene group.

4. The liquid crystal display device according to Claim 1, wherein the liquid crystal composition comprises a compound of the following formula [3-1a],

[3-1a]

wherein $W^1$ is a structure selected from the following formula [3-a] to formula [3-e], $W^2$ is a single bond or a $C_{1-24}$ alkylene group, provided that an optional —CH$_2$—in said alkylene group may be substituted by —O—, —CO—, —COO—, —OCO—, —CONH—, —NHCO—, —NH—, —CON(CH$_3$)—, —S— or —SO$_2$—, $W^3$ is a cyclic group having a benzene ring, a cyclohexane ring or a heterocyclic ring, or a $C_{17-51}$ bivalent organic group having a steroid skeleton, provided that an optional hydrogen atom on said cyclic group may be substituted by a $C_{1-3}$ alkyl group, a $C_{1-3}$ alkoxy group, a $C_{1-3}$ fluorine-containing alkyl group, a $C_{1-3}$ fluorine-containing alkoxy group or a fluorine atom, $W^4$ is a single bond, —CH$_2$—, —O—, —OCH$_2$—, —CH$_2$O—, —COO— or —OCO—, $W^5$ is a cyclic group having a benzene ring, a cyclohexane ring or a heterocyclic ring, provided that an optional hydrogen atom on such a cyclic group may be substituted by a $C_{1-3}$ alkyl group, a $C_{1-3}$ alkoxyl group, a $C_{1-3}$ fluorine-containing alkyl group, a $C_{1-3}$ fluorine-containing alkoxyl group or a fluorine atom, $W^6$ is a $C_{1-18}$ alkyl group, a $C_{2-18}$ alkenyl group, a $C_{1-18}$ fluorine-containing alkyl group, a $C_{1-18}$ alkoxy group or a $C_{1-18}$ fluorine-containing alkoxy group, and nW is an integer of from 0 to 4,

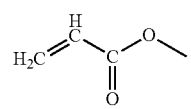
[3-a]

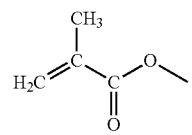
[3-b]

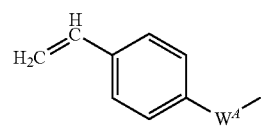
[3-c]

-continued

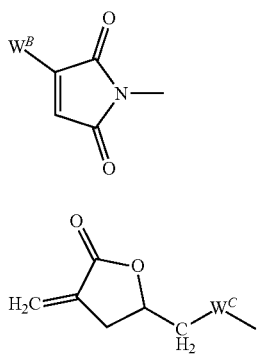
[3-d]

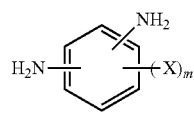
[3-e]

wherein $W^A$ and $W^C$ are each a single bond, —O—, —CH$_2$O—, —COO—, —OCO—, —CONH—, —NHCO— or —NH—, and $W^B$ is a hydrogen atom or a benzene ring.

5. The liquid crystal display device according to Claim 1, wherein the liquid crystal alignment treating agent comprises at least one polymer selected from the group consisting of an acrylic polymer, a methacrylic polymer, a novolak resin, a polyhydroxystyrene, a polyimide precursor, a polyimide, a polyamide, a polyester, cellulose and a polysiloxane.

6. The liquid crystal display device according to claim 5, wherein the liquid crystal alignment treating agent comprises a polyimide precursor obtained by a reaction of a diamine component comprising a diamine having a side chain structure of the above formula [4-1a] or formula [4-2a], and a tetracarboxylic acid component, or a polyimide obtained by imidizing the polyimide precursor.

7. The liquid crystal display device according to Claim 6, wherein the diamine having a side chain structure of formula [4-1a] or formula [4-2a] is of the following formula [4a],

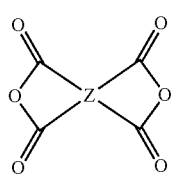
[4a]

wherein X is the above formula [4-1a] or formula [4-2a], and m is an integer of from 1 to 4.

8. The liquid crystal display device according to claim 6, wherein the tetracarboxylic acid component is a tetracarboxylic dianhydride of the following formula [5],

[5]

wherein Z is a structure selected from the following formula [5a] to formula [5l],

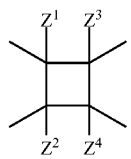
[5a]

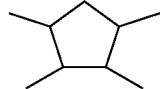
[5b]

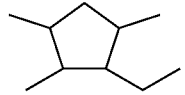
[5c]

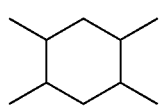
[5d]

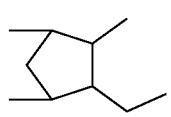
[5e]

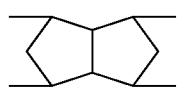
[5f]

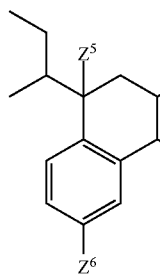
[5g]

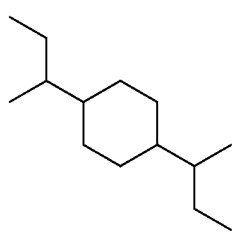
[5h]

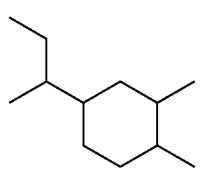
[5i]

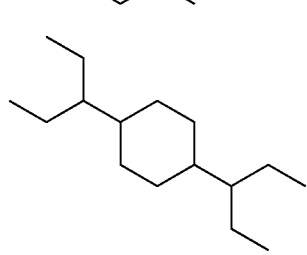
[5j]

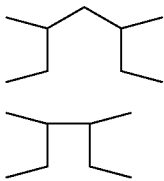

wherein $Z^1$ to $Z^4$ are each a hydrogen atom, a methyl group, a chlorine atom or a benzene ring, and $Z^5$ and $Z^6$ are each a hydrogen atom or a methyl group.

9. The liquid crystal display device according to claim 5, wherein the liquid crystal alignment treating agent comprises a polysiloxane obtained by polycondensing an alkoxysilane of the following formula [A1], or a polysiloxane obtainable by polycondensing an alkoxysilane of the formula [A1] and an alkoxysilane of the following formula [A2] or formula [A3], $(A^1)_m Si(A^2)_n (OA^3)_p$     [A1]

wherein $A^1$ is the above formula [4-1a] or formula [4-2a], $A^2$ is a hydrogen atom or a $C_{1-5}$ alkyl group, $A^3$ is a $C_{1-5}$ alkyl group, m is an integer of 1 or 2, n is an integer of from 0 to 2, p is an integer of from 0 to 3, provided that m+n+p is 4, $(B^1)_m Si(B^2)_n (OB^3)_p$     [A2]

wherein $B^1$ is a $C_{2-12}$ organic group having at least one selected from the group consisting of a vinyl group, an epoxy group, an amino group, a mercapto group, an isocyanate group, a methacryl group, an acryl group, an ureido group and a cinnamoyl group, $B^2$ is a hydrogen atom or a $C_{1-5}$ alkyl group, m is an integer of 1 or 2, n is an integer of from 0 to 2, p is an integer of from 0 to 3, provided that m+n+p is 4, $(D^1)_n Si(OD^2)_{4-n}$     [A3]

wherein $D^1$ is a hydrogen atom or a $C_{1-5}$ alkyl group, $D^2$ is a $C_{1-5}$ alkyl group, and n is an integer of from 0 to 3.

10. The liquid crystal display device according to claim 1, wherein the liquid crystal alignment treating agent comprises a compound having at least one selected from the group consisting of an epoxy group, an isocyanate group, an oxetane group, a cyclocarbonate group, a hydroxy group, a hydroxyalkyl group and a lower alkoxyalkyl group.

11. The liquid crystal display device according to claim 1, wherein the liquid crystal alignment treating agent comprises at least one selected from the group consisting of 1-hexanol, cyclohexanol, 1,2-ethanediol, 1,2-propanediol, propylene glycol monobutyl ether, ethylene glycol monobutyl ether, dipropylene glycol dimethyl ether, cyclohexanone, cyclopentanone and solvents of the following formula [D1] to formula [D3],

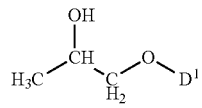   [D1]

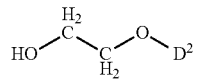   [D2]

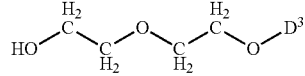   [D3]

wherein $D^1$ and $D^2$ are each a $C_{1-3}$ alkyl group, and $D^3$ is a $C_{1-4}$ alkyl group.

12. The liquid crystal display device according to claim 1, wherein the liquid crystal alignment treating agent comprises at least one selected from the group consisting of N-methyl-2-pyrrolidone, N-ethyl-2-pyrrolidone and γ-butyrolactone.

13. The liquid crystal display device according to claim 1, wherein the ultraviolet irradiation apparatus is capable of controlling the intensity and wavelength of ultraviolet light for irradiation, and the surface temperature of the pair of substrates.

14. The liquid crystal display device according to claim 13, wherein the ultraviolet irradiation apparatus employs an ultraviolet light-emitting diode as a light source.

15. The liquid crystal display device according to any claim 1, wherein the substrates are plastic substrates.

* * * * *

UNITED STATES PATENT AND TRADEMARK OFFICE
CERTIFICATE OF CORRECTION

Page 1 of 1

PATENT NO. : 10,824,000 B2
APPLICATION NO. : 16/079888
DATED : November 3, 2020
INVENTOR(S) : Kazuyoshi Hosaka et al.

It is certified that error appears in the above-identified patent and that said Letters Patent is hereby corrected as shown below:

On the Title Page

Item (73), the 2nd Assignee's name is misspelled. Item (73) should read:
--(73) Assignees: Nissan Chemical Corporation, Chuo-ku (JP);
Kyusyu Nanotec Optics Co., Ltd., Hayami-gun (JP)--

Signed and Sealed this
Twenty-second Day of December, 2020

Andrei Iancu
*Director of the United States Patent and Trademark Office*